United States Patent
Ueno et al.

(10) Patent No.: US 7,809,198 B2
(45) Date of Patent: Oct. 5, 2010

(54) CODING APPARATUS HAVING RATE CONTROL TO PREVENT BUFFER BREAKDOWN

(75) Inventors: Hiromichi Ueno, Kanagawa (JP); Shinpei Ikegami, Kanagawa (JP)

(73) Assignee: Sony Corporation, Tokyo (JP)

( * ) Notice: Subject to any disclaimer, the term of this patent is extended or adjusted under 35 U.S.C. 154(b) by 1331 days.

(21) Appl. No.: 10/792,820

(22) Filed: Mar. 5, 2004

(65) Prior Publication Data

US 2005/0152450 A1    Jul. 14, 2005

(30) Foreign Application Priority Data

Mar. 6, 2003    (JP)    ............... 2003-060042

(51) Int. Cl.
*G06K 9/36*    (2006.01)
(52) U.S. Cl. ...................................... 382/232; 382/236
(58) Field of Classification Search .................. 382/232, 382/233, 253
See application file for complete search history.

(56) References Cited

U.S. PATENT DOCUMENTS

| | | | |
|---|---|---|---|
| 5,774,593 A * | 6/1998 | Zick et al. .................... | 382/236 |
| 6,084,641 A * | 7/2000 | Wu ............................. | 348/722 |
| 6,091,777 A * | 7/2000 | Guetz et al. ............. | 375/240.11 |
| 6,963,606 B1 * | 11/2005 | Yanagihara et al. ..... | 375/240.01 |
| 7,162,080 B2 * | 1/2007 | Chui et al. ................... | 382/168 |
| 2002/0021753 A1 * | 2/2002 | Igi et al. ................ | 375/240.01 |

FOREIGN PATENT DOCUMENTS

| | | |
|---|---|---|
| JP | 10-75444 | 3/1998 |
| JP | 11-205803 | 7/1999 |
| JP | 2000-358247 | 12/2000 |
| JP | 2004-7498 | 1/2004 |
| WO | WO 9923834 A1 * | 5/1999 |

* cited by examiner

*Primary Examiner*—Brian Q Le
*Assistant Examiner*—Edward Park
(74) *Attorney, Agent, or Firm*—Oblon, Spivak, McClelland, Maier & Neustadt, L.L.P.

(57) ABSTRACT

A coding apparatus and method is disclosed by which quantization index data can be determined without referring to a virtual buffer capacity initialized in response to a scene change. ME residual information is acquired first, and it is discriminated whether or not the ME residual information is higher than a threshold value. If it is discriminated that the ME residual information is higher than the threshold value, then the initial buffer capacity of a virtual buffer is updated. On the other hand, if it is discriminated that the ME residual information is equal to or lower than the threshold value, then it is discriminated whether or not the picture being currently processed is a picture next to a scene change or is a next picture of the same type as that of a picture with which a scene change has occurred. If it is discriminated that the picture being processed is a picture next to a scene change or a next picture of the same type, then the initial buffer capacity is calculated and updated. Further, an average value of the ME residual information is updated. The invention can be applied to a video encoder.

19 Claims, 11 Drawing Sheets

FIG. 1
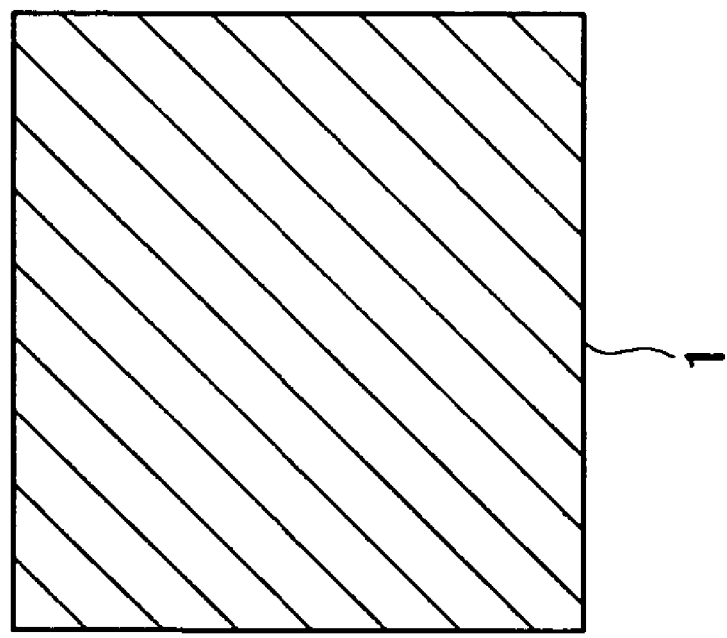
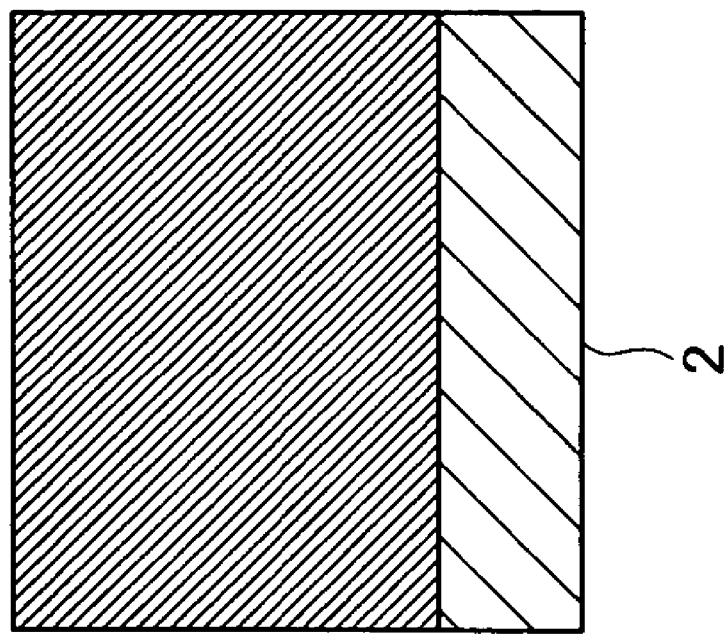

CODING APPARATUS HAVING RATE CONTROL TO PREVENT BUFFER BREAKDOWN

BACKGROUND OF THE INVENTION

This invention relates to a coding apparatus and method, a program and a recording medium, and more particularly to a coding apparatus and method, a program and a recording medium suitable for use where rate control is performed in order to prevent a breakdown of a VBV buffer.

Various compression coding methods have been proposed for compressing video data and audio data to decrease the information amount. A representative one of the compressing coding methods is the MPEG2 (Moving Picture Experts Group Phase 2). When quantization control of the feedback type is performed in the MPEG2, usually a Q scale used for coding of the „th frame is used to determine an optimum step size for coding of the („+1)th frame.

In the conventional quantization control method, however, if an image 2 having a high degree of global complexity in coding follows another image 1 having a low degree of global complexity in coding as seen in FIG. 1, then a small Q scale of the image 1 which has a low degree of global complexity in coding and is easy to encode is used to start encoding of the succeeding image 2 having a high degree of global complexity in coding. This gives rise to a phenomenon that, upon encoding, a given bit amount is used up at an intermediate portion of the image 2 and encoding of the image 2 is performed correctly only up to the intermediate portion of the image 2.

For example, in the MPEG 2, a method called low delay coding wherein the delay time is reduced to less than 150 [ms] is prepared. In the low delay coding, neither B pictures which cause a reordering delay nor I pictures from which a large amount of codes are generated are used, but only P pictures are used. Further, a P picture is delineated into an intraslice which includes several slices and an interslice which includes all of the remaining slices so that it can be coded without re-ordering.

For example, where the image 1 and the image 2 of FIG. 1 are low delay coded, if the image 2 having a high degree of global complexity in image coding is coded next to the image 1 having a low degree of global complexity in image coding, then encoding of the image 2 having a high degree of global complexity in coding is started with a comparatively small Q scale. Therefore, a phenomenon appears that the preceding picture remains at some slice or slices at a lower end of the screen of the image 2. This phenomenon has an influence until an intraslice appears at a place where a similar problem appears subsequently.

In order to solve the subject just described, a coding apparatus and a coding method have been proposed wherein coded data with which an image of a high picture quality can be reproduced on the decoder side can be generated in a low delay mode as disclosed, for example, in Japanese Patent Laid-Open No. Hei 11-205803 (hereinafter referred to as Patent Document 1).

In particular, in order to perform quantization control of an ordinary feedback type to determine an optimum quantization step size for each of an intraslice and an interslice to perform quantization control, a scene change wherein a succeeding picture has a pattern much different from that of a preceding picture is detected. If a scene change is detected, then not a quantization index data Q(j+1) calculated based on the preceding picture is used, but an initial buffer capacity d(0) of a virtual buffer is updated based on ME residual information of the picture to be coded next so that the quantization index data Q(j+1) is re-calculated newly. Consequently, even if a scene change occurs, an optimum quantization step size is determined for each of an intraslice and an interslice and used for quantization control.

The ME residual is calculated in a unit of a picture and is a total value of difference values of the luminance between a preceding picture and a succeeding picture. Accordingly, when the ME residual information exhibits a high value, this represents that the pattern of the preceding picture and the pattern of the picture to be coded next are much different from each other, that is, a scene change.

The coding method is described below with reference to FIG. 2.

At step S1, ME residual information obtained, for example, when a motion vector is detected is acquired. The ME residual information acquired is represented by ME_info.

At step S2, an average value avg of ME residual information is subtracted from the acquired ME residual information, and it is discriminated whether or not the resulting difference value is higher than a predetermined threshold value D. The average value avg of the ME residual information is a value updated at step S4 hereinafter described and is given by the following expression (1):

$$avg = 1/2(avg + ME\_info) \quad (1)$$

If it is discriminated at step S2 that the calculated difference value is equal to or lower than the predetermined threshold value D, then since it is discriminated that the pattern of the current picture and the pattern of the immediately preceding picture is not significant, that is, no scene change has occurred, the processing advances to step S4.

On the other hand, if it is discriminated at step S2 that the calculated difference value is higher than the predetermined threshold value D, then it is discriminated that the difference between the pattern of the current picture and the pattern of the preceding picture is significant, that is, a scene change has occurred. Therefore, at step S3, an initial buffer capacity d(0) of a virtual buffer is calculated based on expressions (2), (3), (4) and (5) given below to update the virtual buffer.

X which represents the global complexity (GC) of a picture unit is given by the following expression (2):

$$X = T \times Q \quad (2)$$

where T is the generated code amount of the picture unit, and Q is the average value of the quantization step sizes of the picture unit.

Then, if it is assumed that the global complexity X of the image of the picture unit is equal to the ME residual information ME_info, that is, when the following expression (3) is satisfied, the quantized index data Q of the entire picture is given by the expression (4):

$$X = ME\_info \quad (3)$$

$$Q = \{d(0) \times 31\} / \{2 \times (br/pr)\} \quad (4)$$

where br is the bit rate, and pr is the picture rate.

Further, the initial buffer capacity d(0) of the virtual buffer in the expression (4) is given by the following expression (5):

$$d(0) = 2 \times \{(ME\_info \times br/pr) / 31 \times T\} \quad (5)$$

The initial buffer capacity d(0) of the virtual buffer is substituted back into the expression (4) to calculate the quantized index data Q of the entire picture.

When it is discriminated at step S2 that the calculated difference value is equal to or lower than the predetermined threshold value D or after the process at step S3 comes to an end, the average value avg of the ME residual information is calculated and updated in accordance with the expression (1) given hereinabove at step S4 in preparation for a picture to be supplied next. Thereafter, the processing returns to step S1 so that the processes described hereinabove are repeated.

If a scene change wherein a succeeding picture has a pattern much different from that of a succeeding picture is detected through the process described above with reference to the flow chart of FIG. 2, then the initial buffer capacity d(0) of the virtual buffer is updated with the ME residual information ME_info of the picture to be coded next. Then, the quantized index data Q(j+1) is calculated newly based on the updated value of the initial buffer capacity d(0). Consequently, an optimum quantization step size is determined for each of an intraslice and an interslice in response to a scene change.

A variation of the virtual buffer capacity between a macro block at the first coding position and another macro block at the last coding position of different pictures where the process described above with reference to FIG. 2 is executed is described with reference to FIG. 3. It is assumed that, among pictures 21 to 25 of FIG. 3, a left side one is a picture coded prior in time. Also it is assumed that each of the pictures 21 to 25 is formed from n+1 macro blocks.

For example, if the pictures 21 and 22 have patterns much different from each other, or in other words, if a scene change occurs between the pictures 21 and 22, then the process described hereinabove with reference to FIG. 2 is executed upon coding of the picture 22. Accordingly, the virtual buffer capacity $d1\_0$ at the top coding position of the picture 22 is set to a value higher than that of the virtual buffer capacity $d0\_n$ at the last coding position of the picture 21. Consequently, upon coding of the picture 22, the situation that a given bit amount is used up at an intermediate portion of the screen can be prevented.

Then, if no scene change is detected with regard to the pictures 23 to 25, then the virtual buffer capacity $d2\_0$ at the top coding position of the picture 23 has a value proximate to the virtual buffer capacity $d1\_n$ at the last coding position of the picture 22; the virtual buffer capacity $d3\_0$ at the top coding position of the picture 24 has a value proximate to the virtual buffer capacity $d2\_n$ at the last coding position of the picture 23; and the virtual buffer capacity $d4\_0$ at the top coding position of the picture 25 has a value proximate to the virtual buffer capacity $d3\_n$ at the last coding position of the picture 24.

In this manner, in rate control which is used popularly, the virtual buffer capacity, that is, the quantization value, is determined through feedback in a unit of a macro block. Therefore, when the quantization value is changed to a high value at a scene change, coding of succeeding pictures is performed using an unnecessarily high quantization value although the pattern does not exhibit a significant change as at a scene change until after the quantization value is settled to a value appropriate to the pattern through feedback. This significantly deteriorates the picture quality of several pictures after a scene change.

Further, not only in the low delay coding, but also in a coding process by some other method, in order to prevent a breakdown of the VBV buffer caused by an increase of the generated code amount, for example, by a scene change, such control as to increase the quantization value is performed. Also in this instance, an unnecessarily high quantization value is used for coding for a period of time until after the quantization value is settled to a value appropriate for the pattern through feedback, and this gives rise to deterioration of the picture quality.

Further, in the MPEG-2 TM5 (Test Model 5), since rate control is performed in accordance with the picture type, the value of a virtual buffer for a preceding picture of the same picture type is used as an initial value for a virtual buffer for a picture of an object of coding. Accordingly, images to which the TM5 is applied suffer from deterioration of the picture quality similarly with regard to a next picture of the same picture type to a picture having a quantization value increased as a countermeasure for a scene change.

SUMMARY OF THE INVENTION

It is an object of the present invention to provide a coding apparatus and method, a program and a recording medium wherein, even when a virtual buffer is updated upon occurrence of a scene change, deterioration of the picture quality of several succeeding pictures can be prevented.

In order to attain the object described above, according to an aspect of the present invention, there is provided a coding apparatus for coding frame image data, including determination means for determining quantization index data for first frame image data being currently processed using information regarding a coding process for predetermined second frame image data coded already or initializing a value of an initial buffer capacity of a virtual buffer and determining the quantization image data using the initialized value of the initial buffer capacity of the virtual buffer, quantization means for executing quantization of the first frame image data based on the quantization index data determined by the determination means, and coding means for coding the quantization coefficient data corresponding to the first frame image data quantized by the quantization means, the determination means initializing the value of the initial buffer capacity of the virtual buffer when the first frame image data satisfies a predetermined condition and when the value of the initial buffer capacity of the virtual buffer is in the initialized state as a result of the satisfaction of the predetermined condition by the second frame image data.

In the coding apparatus, quantization index data for first frame image data being currently processed is determined using information regarding a coding process for predetermined second frame image data coded already, or a value of an initial buffer capacity of a virtual buffer is initialized and the quantization image data is determined using the initialized value of the initial buffer capacity of the virtual buffer. Then, the first frame image data are quantized based on the quantization index data, and the quantization coefficient data corresponding to the quantized first frame image data is coded. Then, when the first frame image data satisfies a predetermined condition and when the value of the initial buffer capacity of the virtual buffer is in the initialized state as a result of the satisfaction of the predetermined condition by the second frame image data, the value of the initial buffer capacity of the virtual buffer is initialized.

According to another aspect of the present invention, there is provided a coding method for a coding apparatus for coding frame image data, including a first discrimination step of discriminating whether or not first frame image data being currently processed satisfies a predetermined condition, a first updating step of initializing, when it is discriminated by the process at the first discrimination step that the first frame image data satisfies the predetermined condition, a value of an initial buffer capacity of a virtual buffer to update the value of the initial buffer capacity of the virtual buffer, a second discrimination step of discriminating, when it is discriminated by the process at the first discrimination step that the first frame image data does not satisfy the predetermined condition, whether or not the value of the initial buffer capacity of the virtual buffer is in the initialized state as a result of the satisfaction of the predetermined condition by predetermined second frame image data coded already, and a second updating step of initializing, when it is discriminated by the process at the second discrimination step that the value of the initial buffer capacity of the virtual buffer is in the initialized state as a result of the satisfaction of the predetermined condition by the second frame image data, the value of the initial buffer capacity of the virtual buffer to update the value of the initial buffer capacity of the virtual buffer.

According to a further aspect of the present invention, there is provided a recording medium on or in which a computer-readable program for causing a computer to execute a process of coding frame image data is recorded, the program including a first discrimination step of discriminating whether or not first frame image data being currently processed satisfies a predetermined condition, a first updating step of initializing, when it is discriminated by the process at the first discrimination step that the first frame image data satisfies the predetermined condition, a value of an initial buffer capacity of a virtual buffer to update the value of the initial buffer capacity of the virtual buffer, a second discrimination step of discriminating, when it is discriminated by the process at the first discrimination step that the first frame image data does not satisfy the predetermined condition, whether or not the value of the initial buffer capacity of the virtual buffer is in the initialized state as a result of the satisfaction of the predetermined condition by predetermined second frame image data coded already, and a second updating step of initializing, when it is discriminated by the process at the second discrimination step that the value of the initial buffer capacity of the virtual buffer is in the initialized state as a result of the satisfaction of the predetermined condition by the second frame image data, the value of the initial buffer capacity of the virtual buffer to update the value of the initial buffer capacity of the virtual buffer.

According to a still further aspect of the present invention, there is provided a program for causing a computer to execute a process of coding frame image data, including a first discrimination step of discriminating whether or not first frame image data being currently processed satisfies a predetermined condition, a first updating step of initializing, when it is discriminated by the process at the first discrimination step that the first frame image data satisfies the predetermined condition, a value of an initial buffer capacity of a virtual buffer to update the value of the initial buffer capacity of the virtual buffer, a second discrimination step of discriminating, when it is discriminated by the process at the first discrimination step that the first frame image data does not satisfy the predetermined condition, whether or not the value of the initial buffer capacity of the virtual buffer is in the initialized state as a result of the satisfaction of the predetermined condition by predetermined second frame image data coded already, and a second updating step of initializing, when it is discriminated by the process at the second discrimination step that the value of the initial buffer capacity of the virtual buffer is in the initialized state as a result of the satisfaction of the predetermined condition by the second frame image data, the value of the initial buffer capacity of the virtual buffer to update the value of the initial buffer capacity of the virtual buffer.

In the coding method and the programs, it is discriminated whether or not first frame image data being currently processed satisfies a predetermined condition. When it is discriminated that the first frame image data satisfies the predetermined condition, a value of an initial buffer capacity of a virtual buffer is initialized and updated. However, when it is discriminated that the first frame image data does not satisfy the predetermined condition, it is discriminated whether or not the value of the initial buffer capacity of the virtual buffer is in the initialized state as a result of the satisfaction of the predetermined condition by predetermined second frame image data coded already. Then, when it is discriminated that the value of the initial buffer capacity of the virtual buffer is in the initialized state as a result of the satisfaction of the predetermined condition by the second frame image data, the value of the initial buffer capacity of the virtual buffer is initialized and updated.

In summary, with the coding apparatus and method and the programs, a frame image can be coded. Particularly, quantization index data can be determined without referring to the virtual buffer capacity when adjustment of the virtual buffer is performed for a frame image which satisfies a predetermined condition such as detection of a scene change.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a view illustrating deterioration of the picture quality which occurs at a scene change;

DETAILED DESCRIPTION OF THE PREFERRED EMBODIMENT

In the following, a preferred embodiment of the present invention will be described with reference to the drawings.

Figure 4:
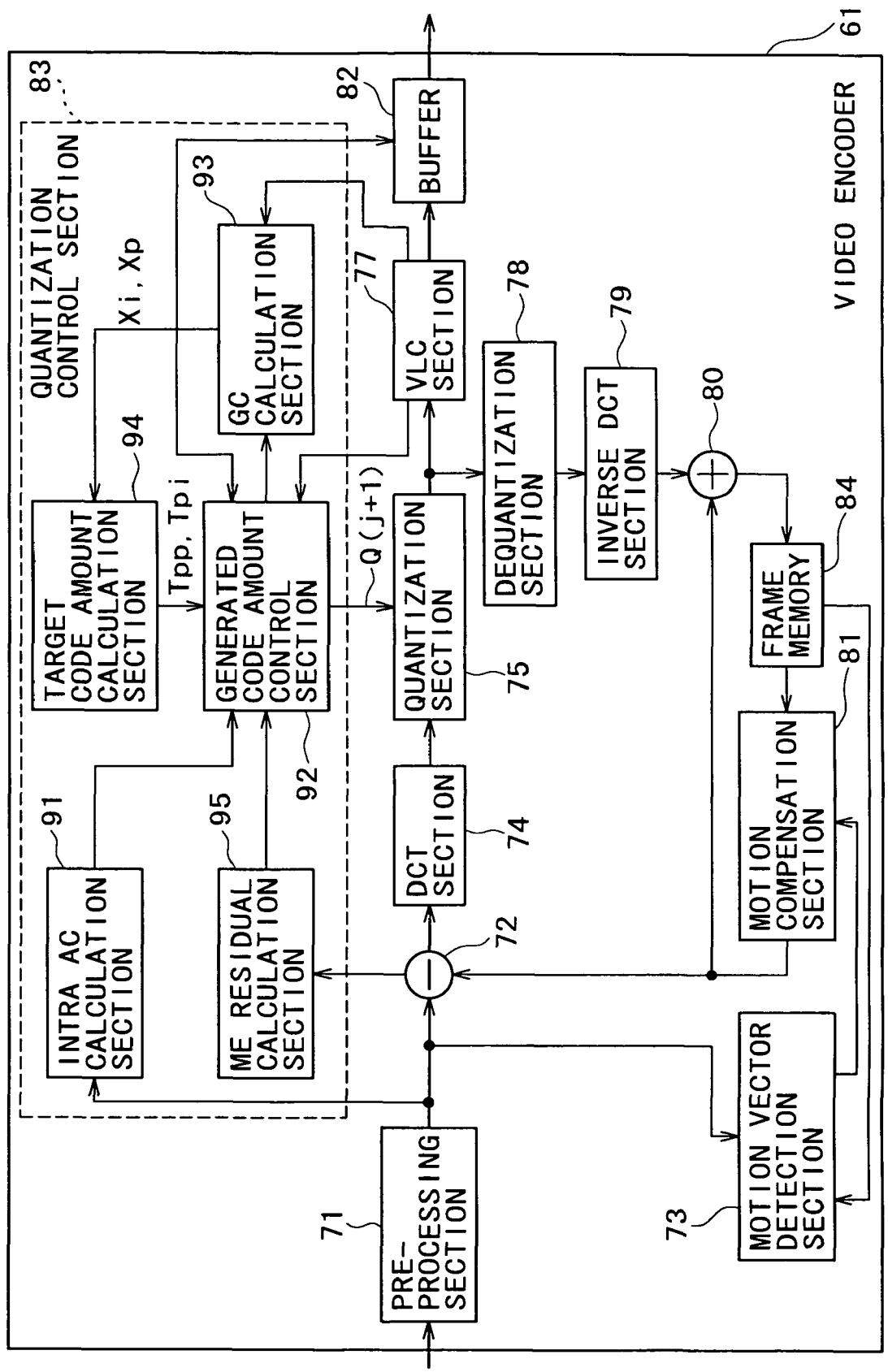
FIG. 4 is a block diagram showing a configuration of a video encoder to which the present invention is applied.

Referring to FIG. 4, there is shown in block diagram a configuration of a video encoder 61 to which the present invention is applied.

The video encoder 61 may encode image data using the low delay cording method which uses, for example, only P pictures. Or, the video encoder 61 may encode image data in the following manner. In particular, it is designated which one of three picture types including intraframe coded image data (hereinafter referred to as I picture), interframe forward predictive coded image data (hereinafter referred to as P picture)

and bidirectional predictive coded image data (hereinafter referred to as B picture) should be used as a picture type, for example, for 15 frames determined as 1 GOP (Group of Contents). Then, the frame images are coded in accordance with the designated frame image picture type (I picture, P picture or B picture.

A pre-processing section 71 re-arranges frame images of image data successively inputted thereto as occasion demands or divides such frame images into macro blocks each formed from a luminance signal for 16 pixels×16 lines and a color difference signal corresponding to the luminance signal to produce macro block data. Then, the pre-processing section 71 supplies the produced macro block data to an arithmetic operation section 72, a motion vector detection section 73 and an intra AC calculation section 91 of a quantization control section 83.

The motion vector detection section 73 receives an input of the macro block data and calculates motion vectors of the macro blocks based on the macro block data and reference image data stored in a frame memory 84. The motion vector detection section 73 signals the calculated motion vectors as motion vector data to a motion compensation section 81.

The arithmetic operation section 72 performs motion compensation for the macro block data supplied thereto from the preprocessing section 71 based on the image type of the macro blocks. More particularly, where the image data supplied to the arithmetic operation section 72 are coded, for example, by the low delay coding method, the arithmetic operation section 72 applies a intra mode to the intraslice and a forward prediction mode to the interslice to perform motion compensation. On the other hand, where the supplied image data are coded in one of the picture types of an I picture, a P picture and a B picture to form a GOP, the arithmetic operation section 72 applies an intra mode to an I picture to perform motion compensation therefor, applies a forward predictive mode to a P picture to perform motion compensation therefor and applies a bidirectional predictive mode to a B picture to perform motion compensation therefor.

The intra mode here is a method wherein a frame image of an object of coding is used as it is as transmission data. The forward predictive mode is a method wherein predictive residuals between a frame image of an object of coding and a past reference image are used as transmission data. The bidirectional mode is a method wherein predictive residuals between a frame image of an object of coding and reference image in the past and in the future are used as transmission data.

First, where macro block data are of an intraslice or an intraframe (I picture) or of an intra macro block, they are processed in the intra mode. In particular, the arithmetic operation section 72 signals the macro block data inputted thereto as they are as arithmetic operation data to a DCT (Discrete Cosine Transform) section 74. The DCT section 74 performs a DCT transform process for the arithmetic operation data inputted thereto to convert them into a DCT coefficient and signals the DCT coefficient as DCT coefficient data to a quantization section 75.

The quantization section 75 performs a quantization process for the DCT coefficient data inputted thereto based on quantized index data Q(j+1) supplied thereto from a generated code amount control section 92 to obtain quantized DCT coefficient data and signals the quantized DCT coefficient data to a VLC (Variable Length Coding) section 77 and a dequantization section 78. The quantization section 75 adjusts the quantization step size for the quantization process in accordance with the quantized index data Q(j+1) supplied thereto from the generated code amount control section 92 to control the amount of codes to be generated.

The quantized DCT coefficient data signaled to the dequantization section 78 are subject to a dequantization process with a quantization step size equal to that of the quantization section 75, and resulting data are signaled as DCT coefficient data to an inverse DCT section 79. The inverse DCT section 79 performs an inverse DCT process for the DCT coefficient data supplied thereto to produce arithmetic operation data and signals the arithmetic operation data to an arithmetic operation section 80 so that they are stored as reference image data into the frame memory 84.

Then, if the macro block data are of an interslice or an interframe or of a non-intra macro block, then the arithmetic operation section 72 performs a motion compensation process by the forward predictive mode or the bidirectional predictive mode for the macro block data.

The motion compensation section 81 performs motion compensation for the reference image data stored in the frame memory 84 with the motion vector data to calculate forward predictive image data or bidirectional predictive image data. The arithmetic operation section 72 uses the forward predictive image data or bidirectional predictive image data supplied thereto from the motion compensation section 81 to execute a subtraction process for the macro block data.

In particular, in the forward predictive mode, the motion compensation section 81 displaces the read address of the frame memory 84 in accordance with the motion vector data to read out reference image data and supplies the reference image data as forward predictive image data to the arithmetic operation section 72 and the arithmetic operation section 80. The arithmetic operation section 72 subtracts the forward predictive image data from the macro block data supplied thereto to obtain difference data as a predictive residual. Then, the arithmetic operation section 72 signals the difference data to the DCT section 74.

The arithmetic operation section 80 receives the forward predictive image data from the motion compensation section 81 and adds the forward predictive image data to the arithmetic operation data supplied thereto from the inverse DCT section 79 to locally reproduce the reference image data. The arithmetic operation section 80 outputs the reference image data to the frame memory 84 so as to be stored into the frame memory 84.

On the other hand, in the bidirectional predictive mode, the motion compensation section 81 displaces the read address of the frame memory 84 in accordance with the motion vector data to read out the reference image data and supplies the reference image data as bidirectional predictive image data to the arithmetic operation section 72 and the arithmetic operation section 80. The arithmetic operation section 72 subtracts the bidirectional predictive image data from the macro block data supplied thereto to obtain difference data as a predictive residual. Then, the arithmetic operation section 72 signals the difference data to the DCT section 74.

The arithmetic operation section 80 receives the bidirectional predictive image data from the motion compensation section 81 and adds the bidirectional predictive image data to the arithmetic operation data supplied thereto from the inverse DCT section 79 to locally reproduce the reference image data. Then, the arithmetic operation section 80 outputs the reference image data to the frame memory 84 so as to be stored into the frame memory 84.

Thus, the image data inputted to the video encoder 61 are subject to the motion compensation prediction process, DCT process and quantization process and are supplied as quantized DCT coefficient data to the VLC section 77. The VLC section 77 performs a variable length coding process based on a predetermined conversion table for the quantized DCT coefficient data and signals resulting variable length coded data to a buffer 82. Further, the VLC section 77 signals a generated code amount data B(j) representative of the number of coded generated bits for each macro block to the generated code amount control section 92 and a GC (Global Complexity) calculation section 93 of the quantization control section 83.

The GC calculation section 93 successively stores the generated code amount data B(j) for the individual macro blocks. Then, at a point of time when all of the generated code amount data B(j) for one picture are stored, the GC calculation section 93 cumulatively adds the generated code amount data B(j) for all of the macro blocks to generate a generated code amount for one picture.

Then, the GC calculation section 93 uses the following expression (6) to calculate the product of the generated code amount of the intraslice part of one picture and the average value of the quantization step sizes in the intraslice part to determine GC data Xi representative of the global complexity (hereinafter referred to as GC) of the image of the intraslice part. Then, the GC calculation section 93 supplies the GC data Xi to a target code amount calculation section 94.

$$Xi=(Ti/Ni)\times Qi \qquad (6)$$

where Ti is the generated code amount of the intraslice, Ni the intraslice number, and Qi the average value of the quantization step sizes of the intraslice.

Simultaneously, the GC calculation section 93 uses the following expression (7) to calculate the product of the generated code amount of the interslice part of the one picture and the average value of the quantization step sizes in the interslice part to determine GC data Xp of the interslice part. Then, the GC calculation section 93 supplies the GC data Xp to the target code amount calculation section 94.

$$Xp=(Tp/Np)\times Qp \qquad (7)$$

where Tp is the generated code amount of the interslice, Np the interslice number, and Qp the average value of the quantization step sizes of the interslice.

The target code amount calculation section 94 uses the expression (8) given below to calculate target generated code amount data Tpi of the intraslice part of a next structure based on the GC data Xi supplied thereto from the GC calculation section 93. Further, the target code amount calculation section 94 uses the expression (9) given below to calculate target generated code amount data Tpp for the interslice part of the next picture based on the GC data Xp supplied thereto from the GC calculation section 93. Then, the target code amount calculation section 94 signals the calculated target generated code amount data Tpi and Tpp to the generated code amount control section 92.

$$Tpi=\{(Ni\times Xi)/(Np\times Xp)+(Np\times Xi)\}\times Xp \qquad (8)$$

$$Tpp=\{(Np\times Xp)/(Np\times Xp)+(Ni\times Xi)\}\times Xp \qquad (9)$$

An ME residual calculation section 95 calculates ME residual information ME_info based on the macro block data inputted thereto and outputs the ME residual information ME_info to the generated code amount control section 92. The ME residual information ME_info is calculated in a unit of a picture and is a total value of difference values of the luminance between a preceding picture and a succeeding picture. Accordingly, when the ME residual information ME_info indicates a high value, this represents that the pattern of the preceding picture is much different from the pattern of the picture to be coded next, that is, a scene change occurs between the two pictures.

Where the pattern of a preceding picture and the pattern of a picture to be coded next are much different from each other, it is not appropriate to determine the quantization step size of the quantization section 75 with the quantized index data Q(j+1) produced based on the target generated code amount data Tpi and Tpp calculated using image data of the preceding picture. Accordingly, when a scene change occurs, the target generated code amount data Tpi and Tpp may be calculated newly.

The intra AC calculation section 91 calculates an intra AC and outputs mad_info representative of the value of the intra AC at present and prev_mad_info representative of the preceding value of the intra AC to the generated code amount control section 92.

The intra AC is a parameter defined as the sum total of dispersion values from video data of the DCT blocks of a DCT processing unit in the MPEG method and indicates a degree of complexity of the image. The intra AC has a correlation to the global complexity of the pattern of the image and the amount of data after compression. In other words, the intra AC is the sum total in the screen of the absolute value sums of differences each obtained by subtracting an average value of pixel values of pixels in a block from the pixel values of the pixels in a unit of a DCT block. The intra AC (IntraAC) is represented by the following expression (10):

$$IntraAC = \sum_{picture} \sum_{k=1}^{64} |Pk - \overline{P}| \qquad (10)$$

In the expression (10), the following expression (11) is satisfied:

$$\overline{P} = \frac{1}{64}\sum_{k=1}^{64} Pk \qquad (11)$$

The intra AC calculation section 91 calculates an intra AC which is a value representative of the global complexity of the image and outputs mad_info representative of the value of the intra AC at present and prev_mad_info representative of the preceding value of the intra AC to the generated code amount control section 92.

The generated code amount control section 92 uses the equation (1) and the ME residual information ME_info supplied from the ME residual calculation section 95 to calculate the average value avg of the ME residual information. Then the generated code amount control section 92 discriminate whether or not a scene change occurs, based on the calculated average value avg of the ME residual information.

The generated code amount control section 92 updates the initial buffer capacity of the virtual buffer based on a predetermined condition such as occurrence of a scene change and determines a quantization step size based on the updated initial buffer amount of the virtual buffer. Or, the generated code amount control section 92 can determine a quantization step size based on a buffer occupation amount of a picture coded in the past (for example, where the TM5 is applied, the picture is a picture of the same picture type coded in the past, but where the TM5 is not applied, the picture is the immediately preceding picture).

The generated code amount control section 92 has a flag in the inside thereof. The flag is placed into an active state when the initial buffer capacity d(0) of the initial buffer is updated because of satisfying a predetermined condition that a scene change occurs or not, or the like, and then placed into an inactive state when the initial buffer capacity d(0) is updated again at a next picture (in the TM5, a next picture of the same picture type). It is to be noted that, where the TM5 is applied, the generated code amount control section 92 can retain information of the picture type of a picture with which updating of the initial buffer capacity d(0) is performed.

It is to be noted that the description given with reference to FIG. 4 relates to a case wherein, in order to code a certain picture, information regarding the immediately preceding picture is referred to to determine the quantization step size. However, for example, where the TM5 wherein rate control is performed in accordance with the picture type is applied, information regarding a picture of the same picture type which has been coded last is referred to to determine the quantization step size.

In particular, the generated code amount control section 92 normally supervises the stored state of variable length code data stored into the buffer 82 and determines, where the initial buffer capacity of the virtual buffer is initialized and not updated, the quantization step size based on occupation amount information representative of the stored state.

The generated code amount control section 92 increases the quantization step size to decrease the generated code amount when the actually generated code amount data B(j) of a macro block is greater than the target generated code amount data Tpi at a portion corresponding to an intraslice, intraframe or intra macro block. On the other hand, when the actually generated code amount data B(j) is smaller than the target generated code amount data Tpi, the generated code amount control section 92 decreases the quantization step size to increase the generated code amount.

Similarly, the generated code amount control section 92 increases the quantization step size to decrease the generated code amount when the actually generated code amount data B(j) of a macro block is greater than the target generated code amount data Tpp at a portion corresponding to an interslice, interframe or non-intra macro block. On the other hand, when the actually generated code amount data B(j) is smaller than the target generated code amount data Tpp, the generated code amount control section 92 decreases the quantization step size to increase the generated code amount.

Figure 5:
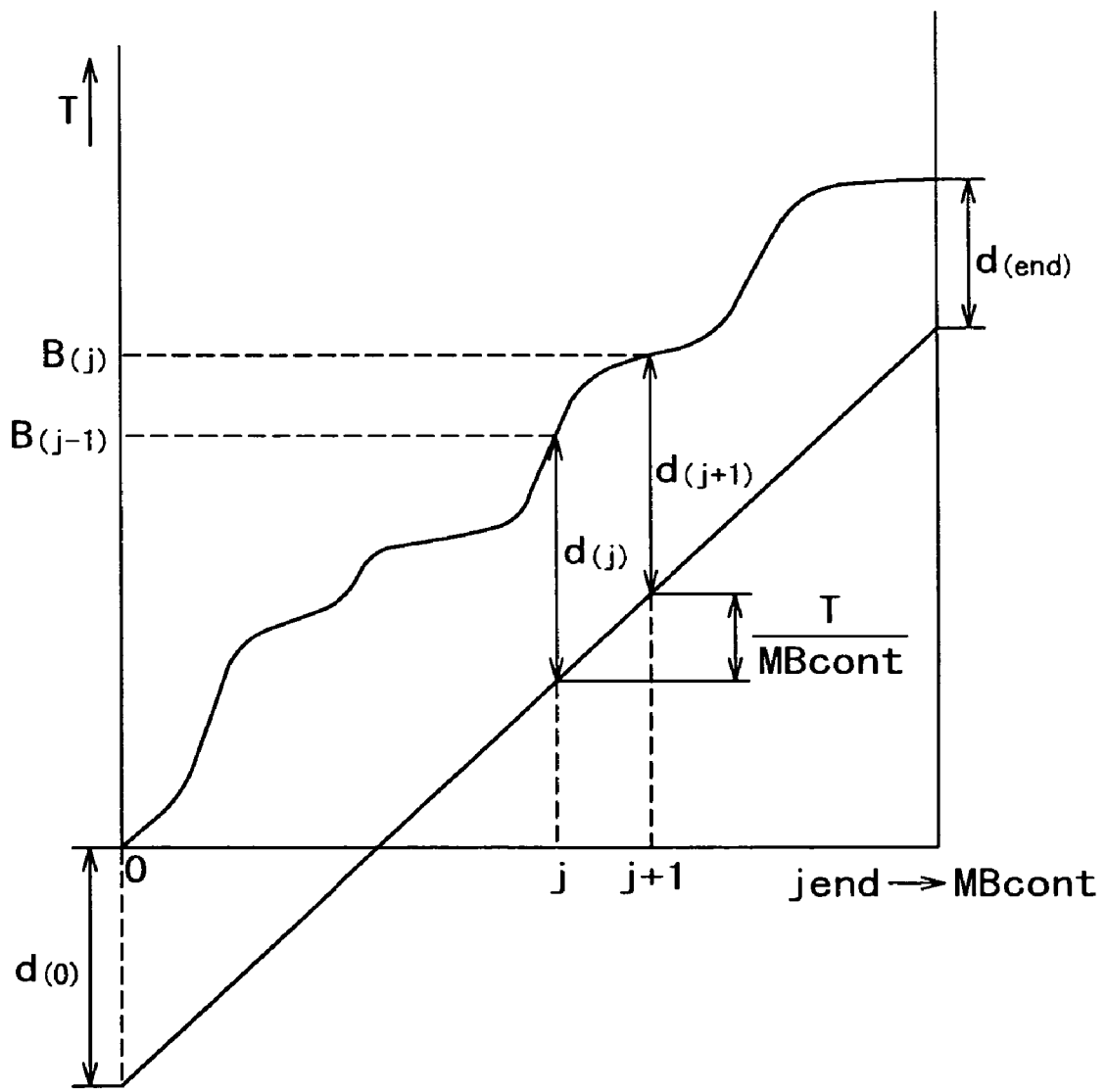
FIG. 5 is a diagram illustrating the buffer occupation amount of a virtual buffer.

In particular, the generated code amount control section 92 assumes a transition of the stored state of variable length coded data stored in a VBV buffer provided on the decoder side to represent the buffer occupation amount d(j) of the virtual buffer for the jth macro block in accordance with the expression (12) given bellow as seen in FIG. 5. Further, the generated code amount control section 92 represents the buffer occupation amount d(j+1) of the virtual buffer for the j+1th macro block in accordance with the description (13). Then, the generated code amount control section 92 subtracts the expression (13) from the expression (12) to transform the buffer occupation amount d(j+1) of the virtual buffer for the j+1th macro block into an expression (14) given below.

$$d(j)=d(0)+B(j-1)-\{T\times(j-1)/MBcnt\} \quad (12)$$

where d(0) is the initial buffer capacity, B(j) the coded generated bit number in the jth macro block, MBcnt the number of macro blocks in the picture, and T the target generated code amount in a unit of a picture.

$$d(j+1)=d(0)+B(i)-(T\times j)/MBcnt \quad (13)$$

$$d(j+1)=d(j)+\{B(j)-B(j-1)\}-T/MBcnt \quad (14)$$

Then, the generated code amount control section 92 sets the target generated code amounts Tpi and Tpp to be allocated to each of the macro blocks of the picture. In this instance, for example, where the low delay coding is applied, since the macro blocks in the picture are divided into those of the intraslice part and those of the interslice part, the generated code amount control section 92 sets the target generated code amounts Tpi and Tpp to the macro blocks of the intraslice part and the macro blocks of the interslice part separately from each other as seen in FIG. 6.

Figure 6:
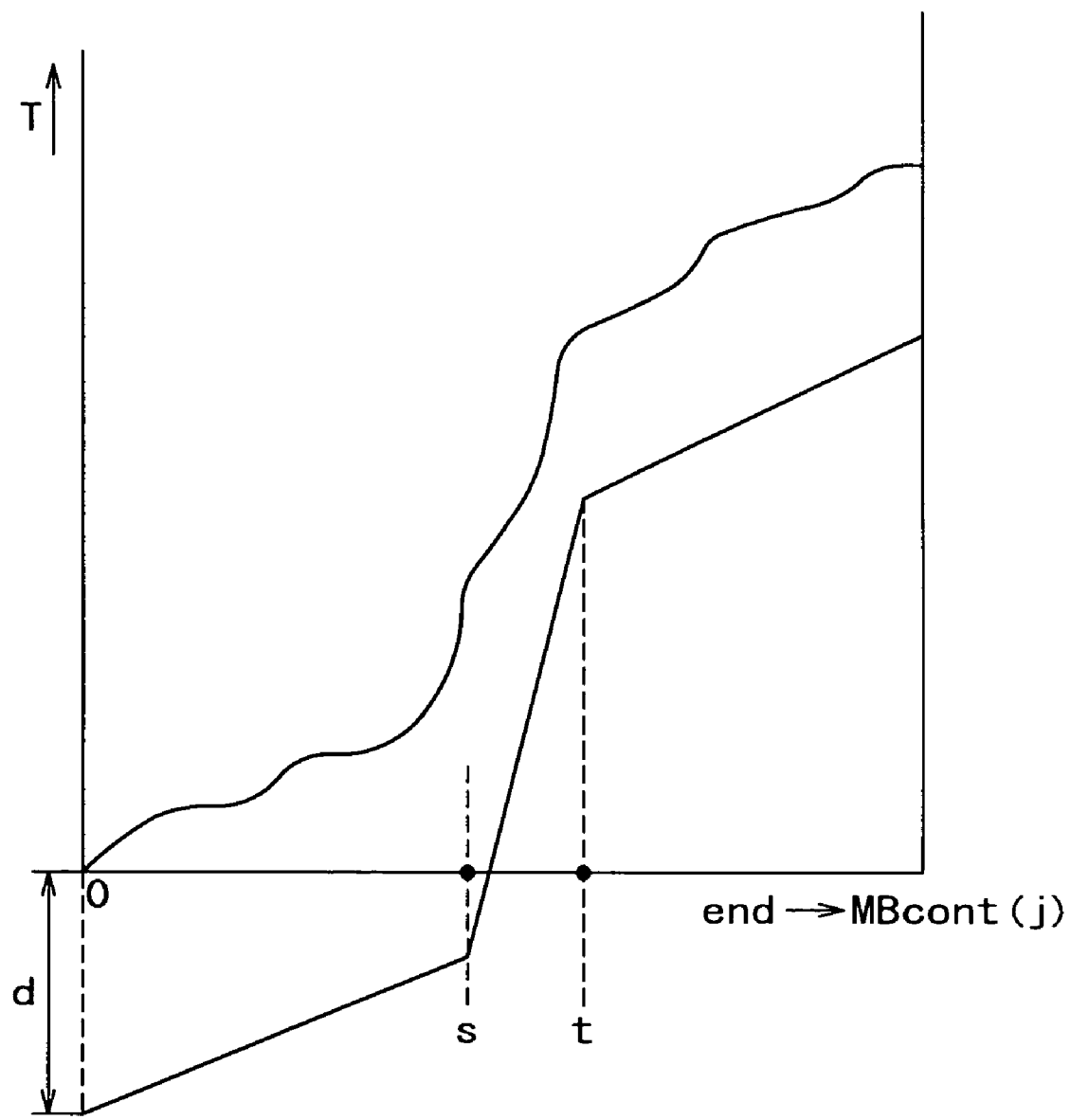
FIG. 6 is a similar view but illustrating the buffer occupation amount of a virtual buffer for each of an intraslice and an interslice.

In the graph of FIG. 6, when the count number of macro blocks is within a range from 0 to s and another range from t to end, the buffer occupation amount d(j+1) at the interslice part can be obtained by substituting the target generated code amount data Tpp for the interslice into the following expression (15):

$$d(j+1) = d(j) + \{B(j) - B(j-1)\} - TPP/(MBcnt - (t - s)) \quad (15)$$

On the other hand, where the count number of macro blocks is within the remaining range from s to t, the buffer occupation amount d(j+1) at the intraslice part can be obtained by substituting the target generated code amount data Tpi for the intraslice into the following expression (16):

$$d(j+1)=d(j)+\{B(j)-B(j-1)\}-Tpi/(t-s) \quad (16)$$

Accordingly, the generated code amount control section 92 calculates the quantized index data Q(j+1) of the macro block j+1 by substituting the buffer occupation amount d(j+1) at the intraslice part and the interslice part and a constant r given by the expression (17) into the expression (18) and supplies the quantized index data Q(j+1) to the quantization section 75.

$$r=(2\times br)/pr \quad (17)$$

$$Q(j+1)=d(j+1)\times(31/r) \quad (18)$$

where br is the bit rate, and pr the picture rate.

It is to be noted that, even where a method different from the low delay coding is used, the generated code amount control section 92 can similarly calculate the buffer occupation amount d(j+1) and the quantized index data Q(j+1) of the intraslice part and the interslice part.

The quantization section 75 determines the quantization step size for a next macro block based on the quantized index data Q(j+1) and quantizes the DCT coefficient data with the determined quantization step size.

Consequently, the quantization section 75 can quantize DCT coefficient data with a optimum quantization step size for the target generated code amounts Tpp and Tpi in a next picture calculated based on actual generated code amount data B(j) in the preceding picture.

Thus, the quantization section 75 can perform quantization so that the buffer 82 may not overflow or underflow in response to the data occupation amount of the buffer 82 and can produce quantized DCT coefficient data quantized so that the VBV buffer on the decoder side may not overflow or underflow.

For example, according to the prior art disclosed in Patent Document 1 mentioned hereinabove, while ordinary quantization control of the feedback type is performed, if the pattern of a picture to be coded subsequently exhibits a great variation, that is, if a scene change occurs, then the feedback type quantization control is stopped. Then, the initial buffer capacity d(0) of the virtual buffer is initialized based on the ME residual information, and then, based on the new initial buffer capacity d(0), the quantized index data Q(j+1) is calculated newly for each of an intraslice and an interslice.

In contrast, in the video encoder 61 to which the present invention is applied, while ordinary quantization control of the feedback type is performed, not only when the pattern of a picture to be coded next exhibits a great different, that is, not only when a scene change occurs, but also at a picture next to the picture with which the scene change occurs (in the TM5, at a next picture of the same type), the quantization control of the feedback type is stopped. Then, the initial buffer capacity d(0) of the virtual buffer is initialized based on the ME residual information supplied from the ME residual calculation section 95, and then, based on the initial buffer capacity d(0), the quantized index data Q(j+1) is produced newly for each of the intraslice part and the interslice part.

Consequently, it can be prevented to perform coding using an unnecessarily high quantization value for a picture next to a picture coded using a high quantization value as a result of updating of the buffer capacity performed in order to prevent a breakdown of the buffer. As a result, otherwise possible deterioration of the picture quality of several pictures after a scene change can be prevented.

Now, a virtual buffer updating process 1 is described with reference to a flow chart of FIG. 7. In the virtual buffer updating process 1, if a virtual buffer is updated in response to detection of a scene change, then adjustment of the virtual buffer is executed again at a next picture (in the TM5, a next picture of the same type).

At step S21, the generated code amount control section 92 acquires ME residual information ME_info from the ME residual calculation section 95.

At step S22, the generated code amount control section 92 subtracts the average value avg of the ME residual information from the acquired ME residual information and discriminates whether or not ME_info−avg>D is satisfied, that is, whether or not the calculated value is higher than a predetermined threshold value D. The average value avg of the ME residual information is a value updated at step S26 as hereinafter described and is represented by the expression (1) given hereinabove. It is to be noted that the predetermined threshold value D is a value of a nature that it is tuned while the picture quality is checked.

If it is discriminated at step S22 that the calculated value is equal to or smaller than the predetermined threshold value D, then it is discriminated that the pattern of the picture at present and the pattern of the immediately preceding picture are not much different from each other, that is, no scene change occurs between the pictures. Thus, the processing advances to step S24.

On the other hand, if it is discriminated at step S22 that the calculated value is higher than the predetermined threshold value D, then it is discriminated that the difference between the pattern of the picture at present and the pattern of the immediately preceding picture is significant, that is, a scene change occurs between the pictures. Therefore, the generated code amount control section 92 calculates the initial buffer capacity d(0) of the virtual buffer in accordance with the expressions (2), (3), (4) and (5) given hereinabove, updates the virtual buffer and changes the flag, which indicates that the virtual buffer has been updated, to active.

If it is discriminated at step S22 that the calculated value is equal to or lower than the predetermined threshold value D, then the generated code amount control section 92 refers to the flag provided in the inside thereof and representing that the virtual buffer has been updated to discriminate whether or not the picture being processed is a picture next to the picture with which the scene change has occurred or, where the TM5 is applied, whether or not the picture being processed is a picture next to a picture of the same type with which a scene change had occurred. If it is discriminated at step S24 that the picture being processed is not a picture next to a scene change or that the picture being processed is not a next picture of the same type, then the processing advances to step S26 hereinafter described.

If it is discriminated at step S24 that the picture being processed is a picture next to a scene change or, in the MT5, a next picture of the same type, then the generated code amount control section 92 calculates, at step S25, the initial buffer capacity d(0) of the virtual buffer in accordance with the expressions (2), (3), (4) and (5) given hereinabove, updates the virtual buffer and changes the flag, which indicates the virtual buffer has been updated, to active.

If it is discriminated at step S24 that the picture being processed is not a picture next to a scene change after the process at step S23 comes to an end, or after the process at step S25 comes to an end, the generated code amount control section 92 calculates, at step S26, the average value avg of the ME residual information in accordance with the expression (1) given hereinabove and updates the average value avg in preparation for a picture to be supplied next. Thereafter, the processing returns to step S21 so that the processes described above are repeated.

By such a process as described above, quantization control of the feedback type is not executed, in addition to a case wherein a scene change occurs, for a picture next to a picture with which a scene change occurs or, in the TM5, for a next picture of the same type as that of a picture with which a scene change occurs, but the initial buffer capacity d(0) of the virtual buffer is initialized based on ME residual information supplied from the ME residual calculation section 95, and based on the new initial buffer capacity d(0), the quantized index data Q(j+1) is calculated newly for each intraslice part and for each interslice part. Consequently, updating of the buffer capacity is performed in order to prevent a breakdown of the buffer, and it can be prevented to perform coding using an unnecessarily high quantization value for a picture next to a picture coded using a high quantization value (in the case of the TM5, a next picture of the same type). As a result, otherwise possible deterioration of the picture quality of several pictures after a scene change can be prevented.

The virtual buffer capacities of macro blocks at the first coding position and macro blocks at the last coding position of the different pictures where the present invention is applied are described with reference to FIG. 8.

Figure 2:
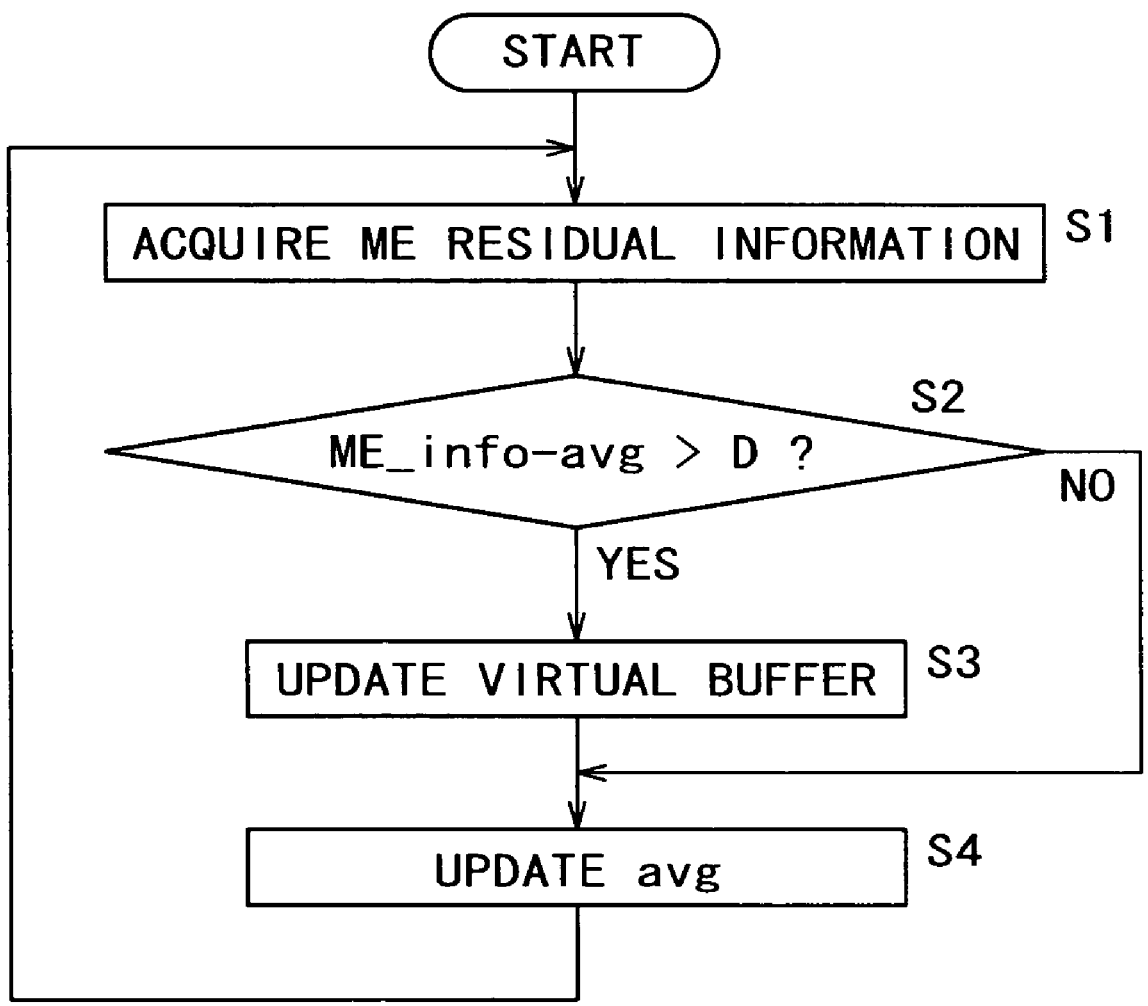
FIG. 2 is a flow chart illustrating a conventional virtual buffer updating process.
Figure 3:
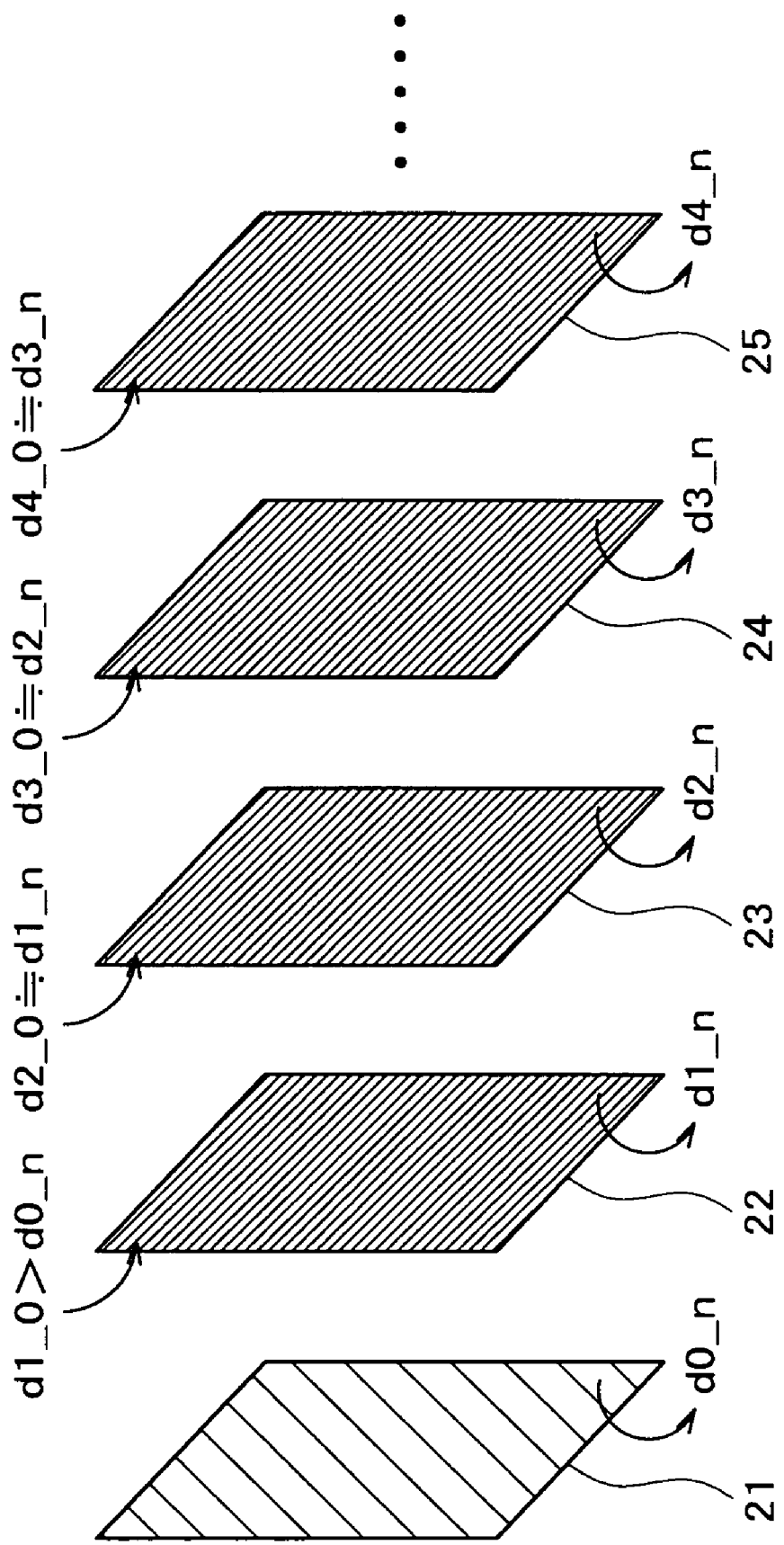
FIG. 3 is a schematic view illustrating a variation of the virtual buffer capacity with regard to different pictures where the process illustrated in FIG. 2 is executed.
Figure 8:
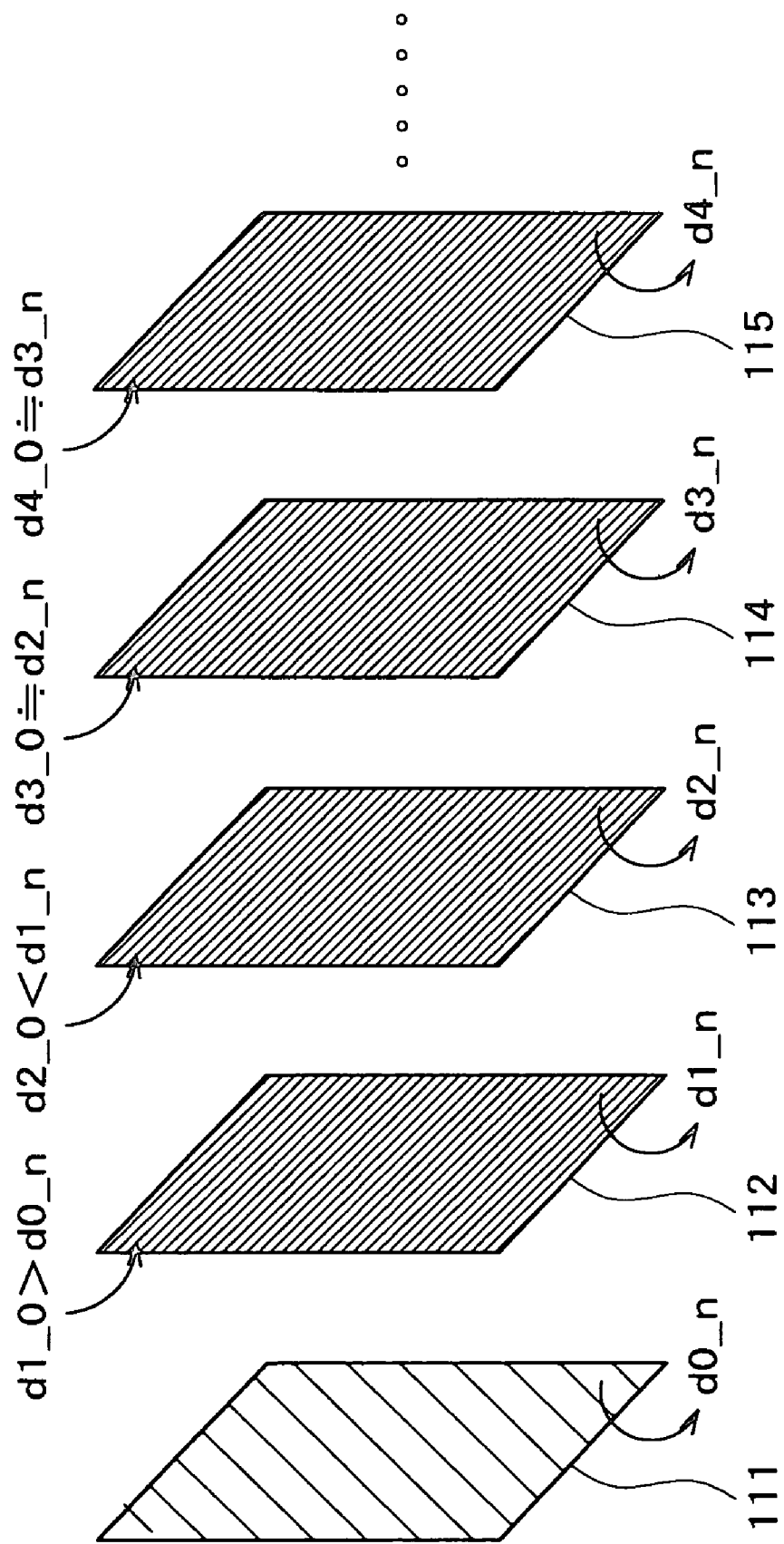
FIG. 8 is a schematic view illustrating a variation of the virtual buffer capacity with regard to different pictures where the process illustrated in FIG. 7 is executed.

It is assumed that, in the pictures 111 to 115 of FIG. 8, a left side picture in the figure is a picture preceding in time similarly as in the pictures 21 to 25 of FIG. 3, and each of the pictures 111 to 115 is formed from n+1 macro blocks. Also it is assumed that the TM5 is applied to coding of the pictures 111 to 115 shown in FIG. 8.

Figure 7:
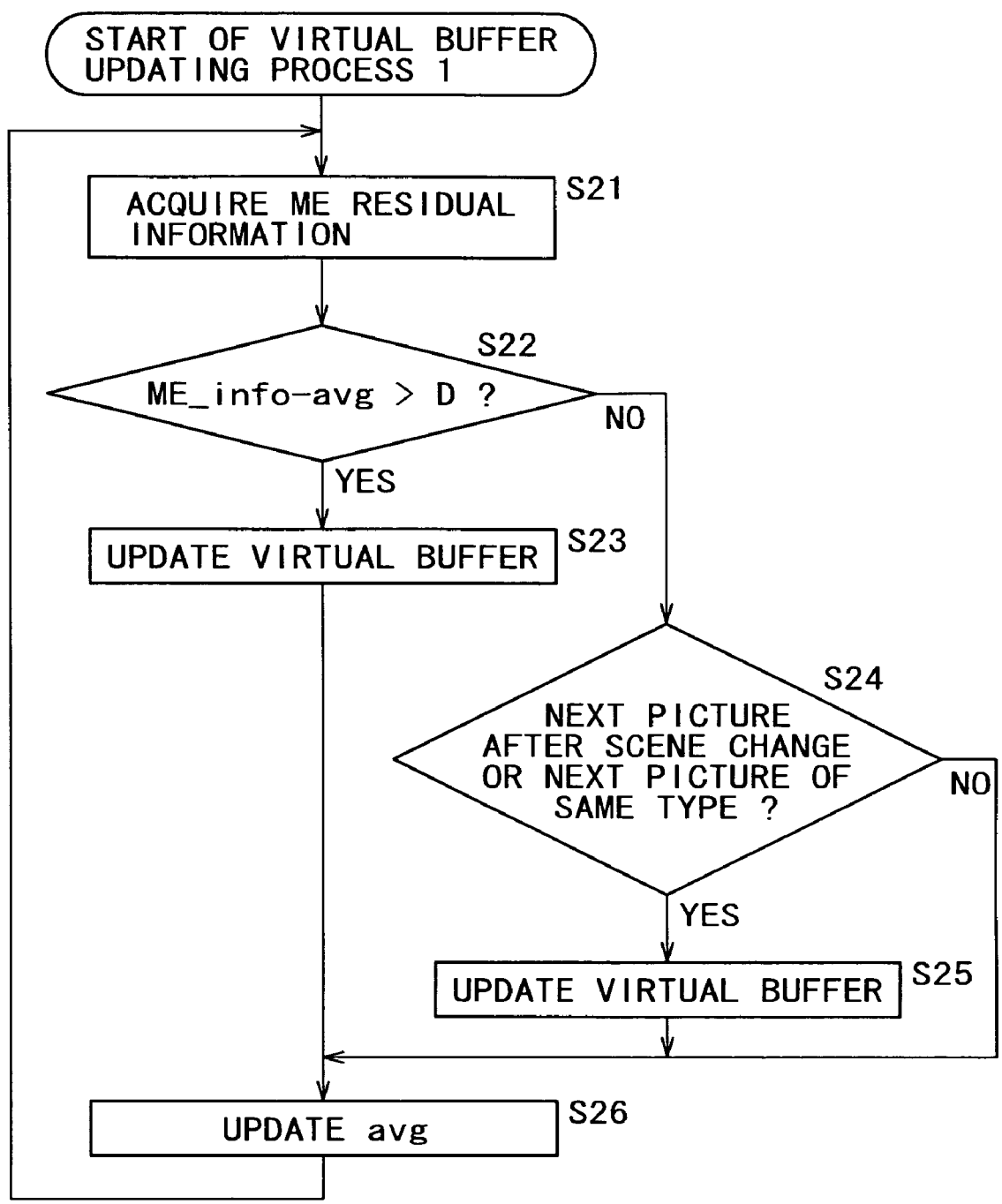
FIG. 7 is a flow chart illustrating a virtual buffer updating process 1 to which the present invention is applied.

For example, where the patterns of the picture 111 and the picture 112 are much different from each other, that is, when a scene change occurs between the pictures 111 and 112, the virtual buffer capacity is updated upon coding of the picture 112 (process at step S23 of FIG. 7). Accordingly, the virtual buffer capacity d1_0 at the top coding position of the picture 112 is set to a value higher than that of the virtual buffer capacity d0_n at the last coding position of the picture 111. Therefore, upon coding of the picture 112, the situation that a given bit amount is used up at an intermediate portion of the screen can be prevented.

Then, although no scene change is detected at the pictures 113 to 115, since it is discriminated that the picture 113 is a picture next to the scene change, the virtual buffer capacity is updated upon coding of the picture 113 (process at step S25 of FIG. 7). Accordingly, the virtual buffer capacity d2_0 at the top coding position of the picture 113 is set to a value lower than that of the virtual buffer capacity d1_n at the last coding position of the picture 112.

Then, the virtual buffer capacity d3_0 at the top coding position of the picture 114 becomes a value proximate to the virtual buffer capacity d2_n at the last coding position of the picture 113, and the virtual buffer capacity d4_0 at the top coding position of the picture 115 becomes a value proximate to the virtual buffer capacity d3_n at the last coding position of the picture 114. Accordingly, upon coding of pictures succeeding the picture 113, it can be prevented to use an unnecessarily high quantization value to perform coding, and therefore, it is possible to prevent the picture quality of several pictures after a scene change from being deteriorated.

It is to be noted that, while it is described that the TM5 is not applied to coding of the pictures 111 to 115 of FIG. 8, also where the TM5 is applied, when it is determined that the difference in pattern from the preceding picture is great, that is, when it is determined that a scene change occurs, the virtual buffer capacity is updated (process at step S23 of FIG. 7). Further, the virtual buffer capacity for a next picture of the same type as that of the picture at which the scene change occurs is updated (process at step S25 of FIG. 7). Consequently, otherwise possible deterioration of the picture quality caused by coding performed using an unnecessarily high quantization value for the next picture of the same type as that of the picture at which the scene change occurs can be prevented.

Incidentally, as described hereinabove with reference to FIG. 7, if only the ME residual is used to discriminate whether or not virtual buffer adjustment should be performed, then the virtual buffer adjustment is performed for both of a scene change from a picture having a low degree of global complexity to another picture having a high degree of global complexity in image coding and another scene change from a picture having a high degree of global complexity to another picture having a low degree of global complexity in image coding. Therefore, the scene change from a picture having a high degree of global complexity to another picture having a low degree of global complexity sometimes deteriorates the picture quality of the picture having a low degree of global complexity with which it should be able to be encoded sufficiently readily. However, where only the ME residual information is used, although it is possible to discriminate whether or not a scene change is present, it cannot be discriminated whether the contents of the scene change are a scene change from a picture having a low degree of global complexity to another picture having a high degree of global complexity or another scene change from a picture having a high degree of global complexity to another picture having a low degree of global complexity.

Therefore, the video encoder 61 of FIG. 4 can be configured so as to use, for example, such information as an intra AC calculated by the intra AC calculation section 91 to perform virtual buffer adjustment only upon a scene change from a picture having a low degree of global complexity to another picture having a high degree of global complexity thereby to prevent deterioration of the picture quality with the image having a low degree of global complexity.

In particular, the intra AC calculation section 91 calculates the intra AC and outputs mad_info representative of the value of the intra AC at present and prev_mad_info representative of the value of the preceding AC to the generated code amount control section 92. The generated code amount control section 92 performs normal quantization control of the feedback type. Then, when the pattern of a picture to be coded next exhibits a great variation, the generated code amount control section 92 discriminates whether or not the initial buffer capacity d(0) of the virtual buffer should be initialized based on the ME residual information ME_info supplied thereto from the ME residual calculation section 95 and prev_mad_info and mad_info supplied thereto from the intra AC calculation section 91. If the initial buffer capacity d(0) of the virtual buffer should be initialized, the generated code amount control section 92 initializes the initial buffer capacity d(0) of the virtual buffer based on the ME residual information ME_info supplied thereto from the ME residual calculation section 95. The initialization of the initial buffer capacity d(0) of the virtual buffer is performed in a similar manner as in the conventional initialization described hereinabove with reference to the expressions (2) to (5).

Then, the intra AC calculation section 91 uses the expressions (12) to (18) to calculate the quantized index data Q(j+1) newly for each of intra portions and inter portions such as an intraslice and an interslice based on the new initial buffer capacity d(0). Then, the intra AC calculation section 91 supplies the calculated quantized index data Q(j+1) to the quantization section 75.

By the process described, otherwise possible deterioration of the picture quality of an image having a low degree of global complexity with which it should be able to be encoded sufficiently readily can be prevented. In this manner, the present invention can be applied also where virtual buffer adjustment is performed only upon a scene change from a picture having a low degree of global complexity to another picture having a high degree of global complexity.

Figure 9:
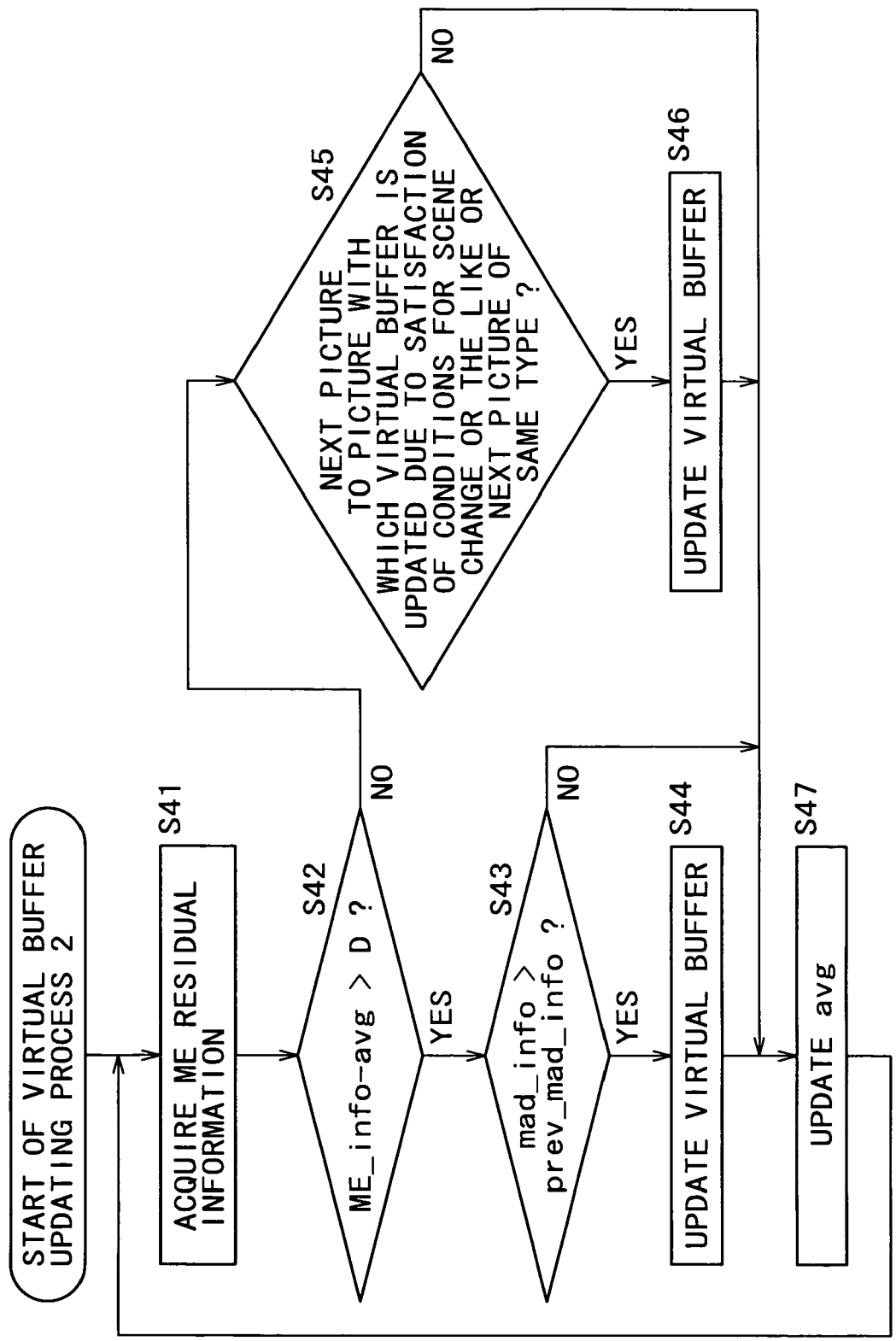
FIG. 9 is a flow chart illustrating a virtual buffer updating process 2 to which the present invention is applied.

FIG. 9 is a flow chart illustrating a virtual buffer updating process 2 performed by the video encoder 61 configured such that image global complexity information such as an intra AC and the discrimination of whether or not a scene change is a change from an image having a low degree of global complexity to another image having a high degree of global complexity is used to perform adjustment of the virtual buffer. In the virtual buffer updating process 2, when a scene change is detected and it is discriminated that the scene change is a change from an image having a low degree of global complexity to another image having a high degree of global complexity and then the virtual buffer is updated, adjustment of the virtual buffer is executed at the next picture (in the TM5, the next picture of the same type).

At steps S41 and S42, processes similar to those at steps S21 and 22 of FIG. 7 are described, respectively. In particular, the generated code amount control section 92 acquires ME residual information ME_info from the ME residual calculation section 95, subtracts the average value avg of the ME residual information from the acquired ME residual information and discriminates whether or not ME_info−avg>0 is satisfied, that is, whether or not the calculated value is higher than a predetermined threshold value D. The average value avg of the ME residual information is a value updated at step S47 hereinafter described and is represented by the expression (1) given hereinabove. It is to be noted that the predetermined threshold value D is a value of a nature that it is tuned while the picture quality is checked.

If it is discriminated at step S42 that the calculated value is equal to or lower than the predetermined threshold value D, then it is discriminated that the pattern of the picture at present and the pattern of the preceding picture are not much different from each other, that is, no scene change is detected. Thus, the processing advances to step S45.

On the other hand, if it is discriminated at step S42 that the calculated value is higher than the predetermined threshold value D, then it is discriminated that the pattern of the picture at present and the pattern of the preceding picture are much different from each other, that is, a, scene change occurs. Thus, the processing advances to step S43, at which the generated code amount control section 92 compares mad_info representing a value of the intra AC after the scene change and prev_mad_info representing a value of the intra AC before the scene change, both acquired from the intra AC calculation section 91, with each other to discriminate whether or not mad_info>prev_mad_info is satisfied.

If it is discriminated at step S43 that mad_info>prev_mad_info is not satisfied, then this scene change is a scene change from an image whose coding is difficult to an image whose coding is easy. Thus, the processing advances to step S47.

On the other hand, if it is discriminated at step S43 that mad_info>prev_mad_info is satisfied, then this scene change is a scene change from an image whose coding is easy to an image whose coding is difficult. Thus, the processing advances to step S44. At step S44, the generated code amount control section 92 performs a process similar to that in the conventional apparatus to update the initial buffer capacity d(0) of the virtual buffer and changes the flag representing that updating of the initial buffer capacity d(0) of the virtual buffer is performed to active because a predetermined condition such as a scene change is satisfied.

In particular, the generated code amount control section 92 calculates the initial buffer capacity d(0) of the virtual buffer based on the expressions (2), (3), (4) and (5) given hereinabove and updates the virtual buffer.

If it is discriminated at step S42 that the calculated value is equal to or lower than the predetermined threshold value D, then the generated code amount control section 92 refers to the flag provided in the inside thereof and representing that the virtual buffer has been updated to discriminate whether or not the picture being processed is a picture next to the picture with which updating of the initial buffer capacity d(0) of the virtual buffer has been performed or, in the TM5, whether or not the picture being processed is a next picture of the same type because it is detected that a predetermined condition such as a scene change is satisfied.

If it is discriminated at step S45 that the picture being processed is a picture next to the picture with which updating of the initial buffer capacity d(0) of the virtual buffer has been performed or, in the TM5, whether or not the picture being processed is a next picture of the same type, then a process similar to that performed at step S25 of FIG. 7 is executed at step S46. In particular, the generated code amount control section 92 calculates the initial buffer capacity d(0) of the virtual buffer based on the expressions (2), (3), (4) and (5) given hereinabove to update the virtual buffer and changes the flag representing that the virtual buffer has been updated to inactive.

When it is detected at step S43 that mad_info>prev_mad_info is not satisfied, when it is discriminated at step S45 after the process at step S44 comes to an end that the picture being processed is not a next picture or a next picture of the same type to the picture with which the virtual buffer has been updated or else after the process at step S46 comes to an end, the generated code amount control section 92 updates, at step S47, the average value avg of the ME residual information with the expression (1) given hereinabove in preparation for a picture to be supplied next. Thereafter, the processing returns to step S41 so that the processes described above are repeated.

By the process described above with reference to the flow chart of FIG. 9, the intra AC is used to perform virtual buffer adjustment only upon a scene change from an image having a low degree of global complexity to another image having a high degree of global complexity. Therefore, otherwise possible further deterioration of the picture quality of an image having a low degree of global complexity with which it should be able to be encoded sufficiently readily can be prevented. Further, when a scene change from a picture having a low degree of global complexity to another picture having a high degree of global complexity is detected, virtual buffer adjustment can be performed also with a picture next to the picture with which the virtual buffer adjustment is performed (in the case of the TM5, a next picture of the same type). Consequently, it can be prevented to perform coding using an unnecessarily high quantization value for a picture next to a picture with which updating of the buffer capacity has been performed in order to prevent a breakdown of the buffer caused by appearance of a scene change (in the case of the TM5, for a next picture of the same type). As a result, otherwise possible deterioration of the picture quality of several pictures after a scene change can be prevented.

However, if virtual buffer adjustment is not performed for all cases wherein a scene change occurs from an image having a high degree of global complexity to another image having a low degree of global complexity as in the process described above with reference to FIG. 9, then this gives rise to the evil of the deterioration in picture quality by a scene change when the magnitude of the change is greater than a fixed level and besides also the degree of global complexity of the image after the change (image discriminated to be an image simpler than the image before the change) is higher than a fixed level, that is, when a scene change from an image having a very high degree of global complexity to another image having a somewhat high degree of global complexity occurs.

This is because, if an image discriminated to be a simple image has a degree of global complexity higher than a fixed level, then there is the possibility that, depending upon the behavior of the virtual buffer at the immediately preceding image having a very high degree of global complexity, a similar problem to that which occurs upon a scene change from an image having a low degree of global complexity to another image having a high degree of global complexity may occur.

Therefore, when the amount of variation upon a scene change from an image having a high degree of global complexity to another image having a low degree of global complexity is higher than a certain fixed level, it is discriminated whether or not the degree of global complexity of the image after the change is higher than a fixed level. Then, if the degree of global complexity of the image after the change is higher than the fixed level, then adjustment of the virtual buffer may be performed.

Figure 10:
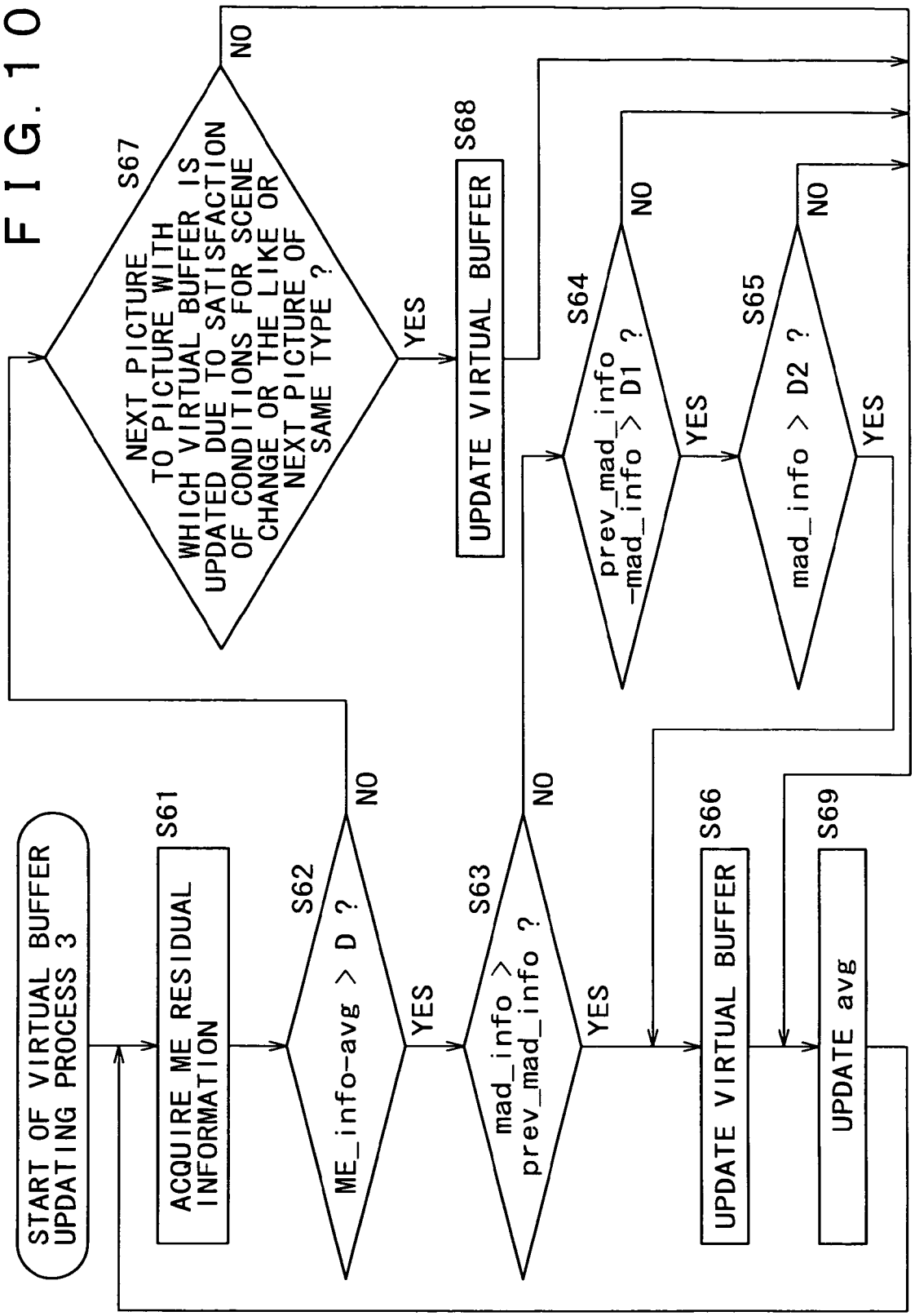
FIG. 10 is a flow chart illustrating a virtual buffer updating process 3 to which the present invention is applied.

FIG. 10 illustrates a virtual buffer updating process 3 wherein, where initialization of a virtual buffer is performed also when the variation upon a scene change from an image having a high degree of global complexity to another image having a low degree of global complexity is higher than a fixed level and besides the degree of global complexity of the image after the change is higher than a fixed level, initialization of the virtual buffer is performed also for a picture next to the picture with which the initialization of the virtual buffer has been performed (in the TM5, for a next picture of the same picture type).

Referring to FIG. 10, at steps S61 to S63, processes similar to those at steps S41 to S43 of FIG. 9 are executed, respectively.

In particular, at step S61, the ME residual information ME_info is acquired from the ME residual calculation section 95, and at step S62, the average value avg of the ME residual information is subtracted from the acquired ME residual information to discriminate whether or not ME_info−avg>D is satisfied. If it is discriminated that ME_info−avg>D is not satisfied, then it is discriminated that the pattern of the current picture and the pattern of the immediately preceding picture do not have a significant difference, that is, no scene change has occurred. Thus, the processing advances to step S67.

If it is discriminated that ME_info−avg>D is satisfied, then it is discriminated that the pattern of the current picture and the pattern of the immediately preceding picture have a significant difference, that is, a scene change has occurred. Thus, mad_info representing the value of the intra AC after the scene change and prev_mad_info representing the value of the intra AC before the scene change, both acquired from the intra AC calculation section 91, are compared, at step S63, with each other to discriminate whether or not mad_info>prev_mad_info is satisfied.

If it is discriminated at step S63 that mad_info>prev_mad_info is not satisfied, then the scene change is a change from an image having a high degree of global complexity to another image having a low degree of global complexity. Thus, at step S64, the generated code amount control_section 92 subtracts mad_info representing the value of the intra AC after the scene change from prev_mad_info representing the value of the intra AC before the scene change to calculate a variation amount of the degree of global complexity in coding, and compares the calculated variation amount with a predetermined threshold value D1 to discriminate whether or not prev_mad_info−mad_info>D1 is satisfied.

Here, the predetermined threshold value D1 is a value for discriminating whether the variation amount in degree of global complexity in coding before and after a scene change is great or small and is a value whose setting can be varied depending upon the quality of the image to be determined.

If it is discriminated at step S64 that prev_mad_info−mad_info>D1 is not satisfied, then the variation amount between the degrees of global complexity in coding before and after the scene change is small. Thus, the processing advances to step S69.

If it is discriminated at step S64 that prev_mad_info−mad_info>D1 is satisfied, then the variation amount between the degrees of global complexity in coding before and after the scene change is great. Thus, the ME generated code amount control section 92 compares, at step S65, mad_info which is a value of the intra AC after the scene change with a predetermined threshold value D2 to discriminate whether or not mad_info>D2 is satisfied.

Here, the predetermined threshold value D2 is a value for discriminating whether or not an image after a scene change has a somewhat high degree of global complexity in coding and is a value whose setting can be varied depending upon the quality of the image to be determined.

If it is discriminated at step S65 that mad_info>D2 is not satisfied, then the image after the scene change is an image which is somewhat simple. Thus, the processing advances to step S69. On the other hand, if it is discriminated at step S65 that mad_info>D2 is satisfied, then the image after the scene change has a somewhat high degree of global complexity. Thus, the processing advances to step S66.

When it is discriminated at step S63 that mad_info>prev_mad_info is satisfied or when it is discriminated at step S65 that mad_info>D2 is satisfied, the generated code amount control section 92 performs, at step S66, a process similar to that in the conventional apparatus to update the initial buffer capacity d(0) of the virtual buffer and changes the flag representing that the virtual buffer has been updated to active.

In particular, the generated code amount control section 92 calculates the initial buffer capacity d(0) of the virtual buffer based on the expressions (2), (3), (4) and (5) given hereinabove and updates the virtual buffer.

If it is discriminated at step S62 that the calculated value is equal to or smaller than the predetermined threshold value D, then processes similar to those at steps S45 and S46 of FIG. 9 are executed at steps S67 and S68, respectively. In particular, the generated code amount control section 92 refers to the flag provided in the inside thereof and representing that the virtual buffer has been updated to discriminate whether or not the picture being processed is a picture next to the picture with which the virtual buffer has been updated or, where the TM5 is applied, whether or not the picture being processes is a picture next to a picture of the same type with which the virtual buffer has been updated because a predetermined condition such as a scene change has been satisfied. If it is discriminated that the picture being processed is a picture next to the picture with which the virtual buffer has been updated or, in the case of the TM5, the picture is a next picture of the same type, then the initial buffer capacity d(0) of the virtual buffer is calculated based on the expressions (2), (3), (4) and (5) given hereinabove, the virtual buffer is updated, and the flag representing that the virtual buffer has been updated is changed to inactive.

When it is discriminated at step S64 that that prev_mad_info−mad_info>D1 is not satisfied, when it is discriminated at step S65 that mad_info>D2 is not satisfied, when it is discriminated at step S67 that the picture being processed is not a picture or a picture of the same type next to the picture with which the virtual buffer has been updated or after the process at step S68 comes to an end, the generated code amount control section 92 updates, at step S69, the average value avg of the ME residual information in accordance with the expression (1) given hereinabove in preparation for a picture to be supplied next. Thereafter, the processing returns to step S61 so that the processes described above are repeated.

By the process described above with reference to FIG. 10, prev_mad_info and mad_info are used to discriminate that the variation of the degree of global complexity (variation from an image having a high degree of global complexity to an image having a low degree of global complexity) is higher than a certain fixed level and besides also the degree of global complexity after the variation is higher than a fixed level. Then, when the discrimination is obtained, adjustment of the virtual buffer is performed. Consequently, appearance of the evil of the deterioration in picture quality by a scene change can be prevented with a higher degree of accuracy. Further, by the process described above, virtual buffer adjustment can be performed also for a picture next to the picture with which adjustment of the virtual buffer has been performed (in the case of the TM5, a next picture of the same type). Consequently, it can be prevented to perform coding using an unnecessarily high quantization value for a picture next to a picture with which updating of the buffer capacity has been performed in order to prevent a breakdown of the buffer by a scene change (in the case of the TM5, for a next picture of the same type). As a result, otherwise possible deterioration of the picture quality of several pictures after a scene change can be prevented.

It is to be noted that, while it is described in the description of the processes of the video encoder 61 given above with reference to FIGS. 4 to 10 that it is discriminated whether or not a scene change has occurred based on the ME residual information calculated by the process of the ME residual calculation section 95, the generated code amount control section 92 may otherwise acquire information representative of a generated position of a scene change from some other external information processing apparatus and discriminate whether or not a scene change has occurred based on the acquired information. Further, information representative of a position of a scene change may be included in video data to be supplied so as to allow the generated code amount control section 92 to discriminate whether or not a scene change has occurred based on whether or not image data supplied includes information representative of a scene change position.

The present invention can be applied also where the low delay coding is configured such that all frame images are formed from P pictures and an image frame of any frame size is formed from regions of various sizes. For example, an image frame of a frame size including 45 macro blocks in a horizontal direction and 24 macro blocks in a vertical direction may be divided such that a region including two macro blocks in the vertical direction from the top of the frame image and 45 macro blocks in the horizontal direction is set as an intraslice part while all of the other macro blocks are set as an interslice part or another region including one macro block in the vertical direction from the top of the frame image and 45 macro blocks in the horizontal direction is set as an intraslice part.

As described above, the present invention can be applied also where, for example, when the low delay encoding is performed, it is designated whether 15 frames should be processed as of an image type of intraframe coded image data (I picture), another image type of interframe forward predictive coded image data (P picture) or a further image type of bidirectional predictive coded image data (B picture) and the frame images are coded in accordance with the designated image type (I picture, P picture or B picture) for the frame images.

Further, while, in the embodiment described above, the present invention is applied to the video encoder 61 as a coding apparatus which uses the MPEG system to perform compression coding, the present invention is not limited to this but may be applied to a coding apparatus which employs any of other various image compression systems.

While the series of processes described above can be executed by hardware, it may otherwise be executed by software. In this instance, for example, the video encoder 61 is formed from such a personal computer 151 as shown in FIG. 11.

Figure 11:
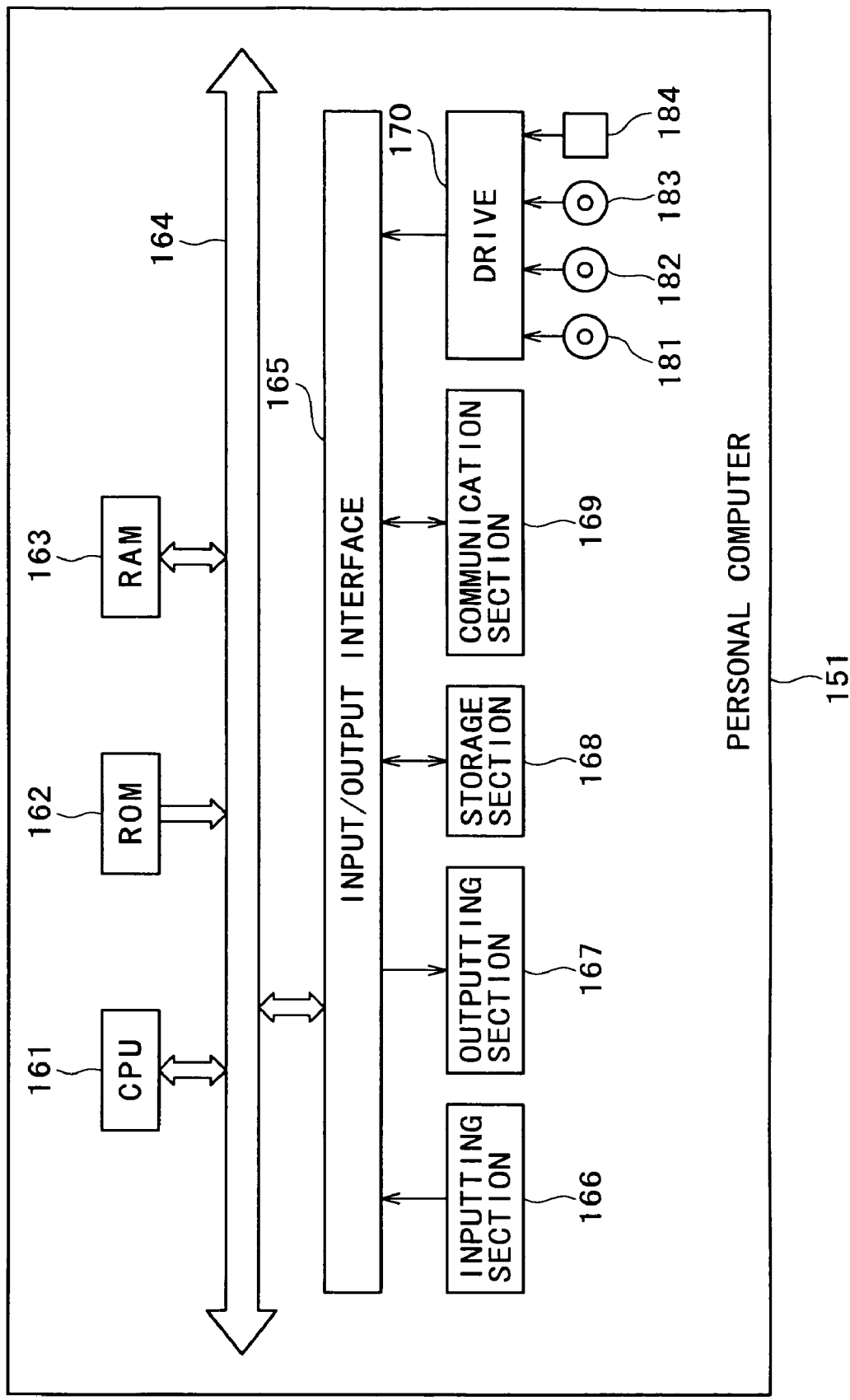
FIG. 11 is a block diagram showing a configuration of a personal computer.

Referring to FIG. 11, a CPU (Central Processing Unit) 161 executes various processes in accordance with a program stored in a ROM (Read Only Memory) 162 or a program loaded from a storage section 168 into a RAM (Random Access Memory) 163. Also data and so forth necessary for the CPU 161 to execute various processes are suitably stored into the RAM 163.

The CPU 161, ROM 162 and RAM 163 are connected to each other by a bus 164. Also an input/output interface 165 is connected to the bus 164.

An inputting section 166 including a keyboard, a mouse and so forth, an outputting section 167 including a display unit, a speaker and so forth, a storage section 168 including a hard disk and so forth and a communication section 169 including a modem, a terminal adapter and so forth are connected to the input/output interface 165. The communication section 169 performs a communication process through a network including the Internet.

As occasion demands, also a drive 170 is connected to the input/output interface 165. A magnetic disk 181, an optical disk 182, a magneto-optical disk 183 or a semiconductor memory 184 is suitably loaded into the drive 170 and a computer program read out from the thus loaded storage medium is installed into the storage section 168 as occasion demands.

Where the series of processes is executed by software, a program which constructs the software is installed from a network or a recording medium into a computer incorporated in hardware for exclusive use or a personal computer for universal use which can execute various functions by installing various programs.

The recording medium may be formed as a package medium such as, as shown in FIG. 11, a magnetic disk 181 (including a floppy disk), an optical disk 182 (including a CD-ROM (Compact Disc-Read Only Memory) and a DVD (including Digital Versatile Disk), a magneto-optical disk 183 (including an MD (Mini-Disc)), or a semiconductor memory 184 which has the program recorded thereon or therein and is distributed in order to provide the program to a user separately from an apparatus body, or as a ROM 162 or a hard disk included in the storage section 168 which has the program recorded therein or thereon and is provided to a user in a form wherein it is incorporated in an apparatus body.

It is to be noted that, in the present specification, the steps which describe the program stored in or on a recording medium may be but need not necessarily be processed in a time series in the order as described, and include processes which are executed parallelly or individually without being processed in a time series.

While a preferred embodiment of the present invention has been described using specific terms, such description is for illustrative purpose only, and it is to be understood that changes and variations may be made without departing from the spirit or scope of the following claims.

What is claimed is:

1. A coding apparatus for coding frame image data, comprising:

determination means for determining quantization index data for first frame image data being currently processed, using information regarding a coding process for second frame image data coded already, or determining the quantization index data for the first frame image data using a value obtained by initializing a value of an initial buffer capacity of a virtual buffer;

means for calculating a residual value based on luminance values of the first frame image data and the second frame image data;

quantization means for executing quantization of the first frame image data on the basis of the quantization index data determined by said determination means; and coding means for coding quantization coefficient data corresponding to the first frame image data quantized by said quantization means, said determination means initializing the value of the initial buffer capacity of said virtual buffer when both of the following conditions are simultaneously true: (1) a difference between the calculated residual value and an average residual value is less than a predetermined threshold, and (2) a scene change occurred between the second frame image data and third frame image data coded immediately preceding the second frame image data, wherein the first frame image data, the second frame image data, and the third frame image data are distinct and separate frames of image data that are processed by the coding apparatus.

2. The coding apparatus according to claim 1, wherein the second frame image data is frame image data coded immediately preceding to the first frame image data.

3. The coding apparatus according to claim 1, wherein the second frame image data is of a picture type that is the same as that of the first frame image data, and the second frame image data of the same picture type was coded immediately preceding to the first frame image data.

4. The coding apparatus according to claim 1, further comprising:
   detection means for detecting a change in pattern between frame image data of a preceding frame and frame image data to be coded next,
   said determination means initializing the value of the initial buffer capacity of said virtual buffer when it is discriminated based on a result of the detection by said detection means that a scene change occurs between the first frame image data and frame image data coded immediately preceding to the first frame image data.

5. The coding apparatus according to claim 1, wherein said determination means discriminates, when said determination means acquires information representing that a scene change occurs between the first frame image data and frame image data coded immediately preceding to the first frame image data, that a predetermined condition is satisfied and initializes the value of the initial buffer capacity of said virtual buffer.

6. The coding apparatus according to claim 1, further comprising:
   first detection means for detecting a change in pattern between frame image data of a preceding frame and frame image data to be coded next; and
   second detection means for detecting a degree of global complexity in coding of the frame image data,
   said determination means discriminating, based on a result of the detection by said first detection means, whether or not a scene change occurs between the first frame image data and frame image data coded immediately preceding to the first frame image data,
   said determination means further discriminating, based on a result of the detection by said second detection means, whether the scene change is a scene change from an image whose coding is less complex to an image whose coding is more complex or another scene change from an image whose coding is more complex to an image whose coding is less complex.

7. The coding apparatus according to claim 6, wherein said determination means discriminates that a predetermined condition is satisfied and initializes the value of the initial buffer capacity of said virtual buffer if said determination means discriminates that a scene change occurs between the first frame image data and the frame image data coded immediately preceding to the first frame image data and that the scene change is a scene change from the image whose coding is less complex to the image whose coding is more complex.

8. The coding apparatus according to claim 6, wherein said determination means discriminates that a predetermined condition is satisfied and initializes the value of the initial buffer capacity of said virtual buffer if said determination means discriminates that a scene change occurs between the first frame image data and the frame image data coded immediately preceding to the first frame image data, and further that the scene change is a scene change from the image whose coding is less complex to the image whose coding is more complex or that the scene change is a scene change from the image whose coding is more complex to the image whose coding is less complex by a variation amount greater than a first predetermined value, and the degree of global complexity in coding of the image after the scene change is higher than a second predetermined value.

9. The coding apparatus according to claim 6, wherein said first detection means includes first calculation means for calculating a first indicator representative of a difference between a pattern of immediately preceding frame image data and a pattern of frame image data to be coded next and detects a change in pattern based on the first indicator calculated by said first calculation means, and said second detection means includes second calculation means for calculating a second indicator representative of a degree of global complexity in decoding of the frame image data and detects the degree of global complexity in coding of the frame image data based on the second indicator calculated by said second calculation means.

10. The coding apparatus according to claim 9, further comprising
    third calculation means for calculating an average value of the first indicators calculated by said first calculation means,
    said determination means discriminating that a predetermined condition is satisfied and initializing the value of the initial buffer capacity of said virtual buffer if a value obtained by subtracting, from the first indicator for the first frame image data calculated by said first calculation means, the average value of the first indicators calculated by said third calculation means using information of frame image data coded preceding to the frame image data immediately preceding to the first frame image data is higher than a predetermined threshold value, and the second indicator calculated by said second calculation means and corresponding to the frame image data immediately preceding to the first frame image data is lower than the second indicator corresponding to the first frame image data.

11. The coding apparatus according to claim 10, wherein the third predetermined threshold value is set in order to discriminate whether or not a scene change occurs between the immediately preceding frame image data and the frame image data to be coded next, and said determination means discriminates that the scene change is a scene change from the image whose coding is less complex to the image whose coding is more complex if the second indicator calculated by said second calculation means and corresponding to the immediately preceding frame image data is lower than the second indicator corresponding to the frame image data to be processed next.

12. The coding apparatus according to claim 9, further comprising:
    third calculation means for calculating an average value of the first indicators calculated by said first calculation means,
    said determination means discriminating that a predetermined condition is satisfied and initializing the value of the initial buffer capacity of said virtual buffer if, where a value obtained by subtracting, from the first indicator for the first frame image data calculated by said first calculation means, the average value of the first indicators calculated by said third calculation means using information of frame image data coded preceding to the frame image data immediately preceding to the first frame image data is higher than a predetermined threshold value, the second indicator calculated by said second calculation means and corresponding to the frame image data immediately preceding to the first frame image data is lower than the second indicator corresponding to the first frame image data or a value obtained by subtracting, from the second indicator calculated by said second calculation means and corresponding to the frame image data immediately preceding to the first frame image data, the second indicator corresponding to the first frame image data is higher than a second threshold value, and the second indicator corresponding to the first frame image data is higher than a third threshold value.

13. The coding apparatus according to claim 12, wherein the first threshold value is set in order to discriminate whether or not a scene change occurs between the immediately preceding frame image data and the frame image data to be coded next, said determination means discriminates that the scene change is a scene change from an image whose coding is less complex to an image whose coding is more complex if the second indicator calculated by said second calculation means and corresponding to the immediately preceding frame image data is lower than the second indicator corresponding to the frame image data to be processed next, the second threshold value being set in order to discriminate whether or not the variation amount of the image by the scene change is great, and the third threshold value being set in order to discriminate whether or not the degree of global complexity in coding of the image after the scene change is high.

14. The coding apparatus according to claim 1, wherein all of the frame image data are interframe forward predictive coded image data.

15. The coding apparatus of claim 1, wherein the determination means includes means for initializing the value of the initial buffer capacity when it is determined, based on analysis of the first frame image data, the second frame image data, and the third frame image data, that two conditions are simultaneously true: (1) the scene change occurred between the third frame image data and the second frame image data, and (2) a scene change did not occur between the second frame image data and the first frame image data.

16. A coding method implemented by a computer programmed as a video encoder configured to code frame image data, comprising:

calculating, by the video encoder, a residual value based on luminance values of first frame image data to be coded and second frame image data already coded;

discriminating, by the video encoder, whether or not a difference between the calculated residual value and an average residual value exceeds a predetermined threshold so as to satisfy a first condition;

initializing, when it is discriminated in the first discrimination step that the first condition is satisfied, a value of an initial buffer capacity of a virtual buffer of the video encoder so as to update the value of the initial buffer capacity of the virtual buffer;

discriminating, when it is discriminated in the first discrimination step that the first condition is not satisfied, whether a scene change occurred between the second frame image data and third frame image data coded immediately preceding the second frame image data; and initializing, when it is discriminated in the second discrimination step that the scene change occurred between the second frame image data and the third frame image data coded immediately preceding the second frame image data, the value of the initial buffer capacity of the virtual buffer so as to update the value of the initial buffer capacity of the virtual buffer when both of the following conditions are simultaneously true: (1) the difference between the calculated residual value and an average residual value is less than the predetermined threshold, and (2) the scene change occurred between the second frame image data and third frame image data and wherein the first frame image data, the second frame image data, and the third frame image data are distinct and separate frames of image data that are processed by the coding apparatus.

17. The coding method according to claim 16, wherein the second frame image data is frame image data coded immediately preceding to the first frame image data.

18. The coding method according to claim 16, wherein the second frame image data is of a picture type that is the same as that of the first frame image data, and the second frame image data of the same picture type was coded immediately preceding to the first frame image data.

19. A non-transitory computer-readable medium storing a computer program for causing a computer to execute a process of coding frame image data is recorded, the program comprising:

calculating a residual value based on luminance values of first frame image data to be coded and second frame image data already coded;

discriminating whether or not a difference between the calculated residual value and an average residual value exceeds a predetermined threshold so as to satisfy a first condition;

initializing, when it is discriminated in the first discrimination step that the first condition is satisfied, a value of an initial buffer capacity of a virtual buffer so as to update the value of the initial buffer capacity of the virtual buffer;

discriminating, when it is discriminated in the first discrimination step that the first condition is not satisfied, whether a scene change occurred between the second frame image data and third frame image data coded immediately preceding the second frame image data; and initializing, when it is discriminated in the second discrimination step that the scene change occurred between the second frame image data and the third frame image data coded immediately preceding the second frame image data, the value of the initial buffer capacity of the virtual buffer so as to update the value of the initial buffer capacity of the virtual buffer when both of the following conditions are simultaneously true: (1) the difference between the calculated residual value and an average residual value is less than the predetermined threshold, and (2) the scene change occurred between the second frame image data and third frame image data and wherein the first frame image data, the second frame image data, and the third frame image data are distinct and separate frames of image data.

* * * * *